United States Patent
Lee et al.

(10) Patent No.: US 12,473,544 B2
(45) Date of Patent: Nov. 18, 2025

(54) COMPOSITION FOR TAGATOSE PRODUCTION AND METHOD FOR PREPARING TAGATOSE USING SAME

(71) Applicants: CJ CHEILJEDANG CORPORATION, Seoul (KR); KOREA ADVANCED INSTITUTE OF SCIENCE AND TECHNOLOGY, Daejeon (KR)

(72) Inventors: Young Mi Lee, Seoul (KR); Seong Bo Kim, Seoul (KR); Eun Jung Choi, Seoul (KR); Ki Jun Jeong, Seoul (KR); Eunjung Jeon, Seoul (KR); Min Soo Cho, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 564 days.

(21) Appl. No.: 17/793,927

(22) PCT Filed: Jan. 20, 2021

(86) PCT No.: PCT/KR2021/000799
§ 371 (c)(1),
(2) Date: Jul. 19, 2022

(87) PCT Pub. No.: WO2021/150019
PCT Pub. Date: Jul. 29, 2021

(65) Prior Publication Data
US 2023/0041854 A1    Feb. 9, 2023

(30) Foreign Application Priority Data

Jan. 20, 2020 (KR) .................. 10-2020-0007490

(51) Int. Cl.
  *C12N 9/90* (2006.01)
  *C12N 15/77* (2006.01)
  *C12P 19/24* (2006.01)
(52) U.S. Cl.
  CPC .............. *C12N 9/90* (2013.01); *C12N 15/77* (2013.01); *C12P 19/24* (2013.01); *C12Y 401/0204* (2013.01)
(58) Field of Classification Search
  CPC . C12N 9/90; C12N 15/77; C12P 19/24; C12P 19/02; C12Y 401/0204; C12Y 501/03
  See application file for complete search history.

(56) References Cited

U.S. PATENT DOCUMENTS

2020/0165639 A1* 5/2020 Zanghellini .............. C12N 9/90
2022/0025420 A1   1/2022 Lee et al.

FOREIGN PATENT DOCUMENTS

| CN | 106399427 A | 2/2017 |
|---|---|---|
| EP | 2 082 044 B1 | 6/2016 |
| KR | 10-0620092 B1 | 8/2006 |
| KR | 10-1632642 B1 | 6/2016 |
| KR | 10-2017-0015250 A | 2/2017 |
| KR | 10-1783170 B1 | 9/2017 |
| KR | 10-2018-0027962 A | 3/2018 |
| KR | 10-2018-0092110 A | 8/2018 |
| KR | 10-2018-0111666 A | 10/2018 |
| KR | 10-2018-0111678 A | 10/2018 |
| KR | 10-1987586 B1 | 6/2019 |
| KR | 10-2074957 B1 | 2/2020 |
| WO | WO 2006-058092 A2 | 6/2006 |
| WO | WO 2018-021894 A1 | 2/2018 |
| WO | WO 2020/067781 A1 | 4/2020 |

OTHER PUBLICATIONS

Reetz et al. "Laboratory Evolution of Stereoselective Enzymes: A Prolific Source of Catalysts for Asymmetric Reactions." Angew. Chem. Int. Ed. 2011, 50, 138-174. (Year: 2011).*
Yang et al. KR20180111666A. Bibliography and Abstract. Machine Translation. Espacenet. (Year: 2018).*
Yang et al. KR20180111666A. Description. Machine Translation. Espacenet. (Year: 2018).*
The extended European search report of EP Application No. 21743844.9 dated May 4, 2023; 11 pages.
English translation of International search report of PCT/KR2021/000799 dated Apr. 22, 2021, 5 pages.
Jo, Sung-Jin et al., "Improvement of poly (3-hydroxybutyrate)[P(3HB)] production in Corynebacterium Glutamicum by codon optimization, point mutation and gene dosage of P(3HB) biosynthetic genes", Journal of Bioscience and Bioengineering, 2007, 104, 6, pp. 457-463; DOI: 10.1263/jbb.104.457.

* cited by examiner

*Primary Examiner* — Adam Weidner
*Assistant Examiner* — Dennis Ignatius Armato, Jr.
(74) *Attorney, Agent, or Firm* — Squire Patton Boggs (US) LLP

(57) ABSTRACT

The present disclosure relates to a composition for tagatose production and a method for preparing tagatose using the same.

7 Claims, 4 Drawing Sheets
Specification includes a Sequence Listing.

[FIG. 1]
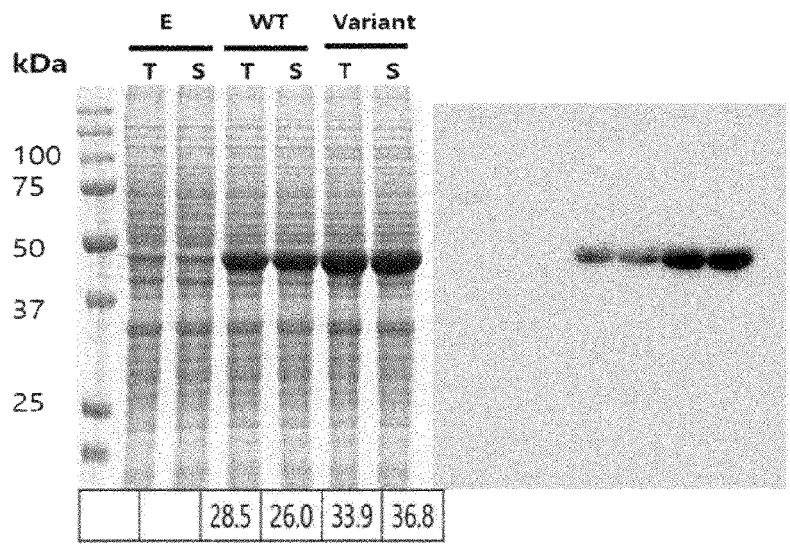
[FIG. 2]
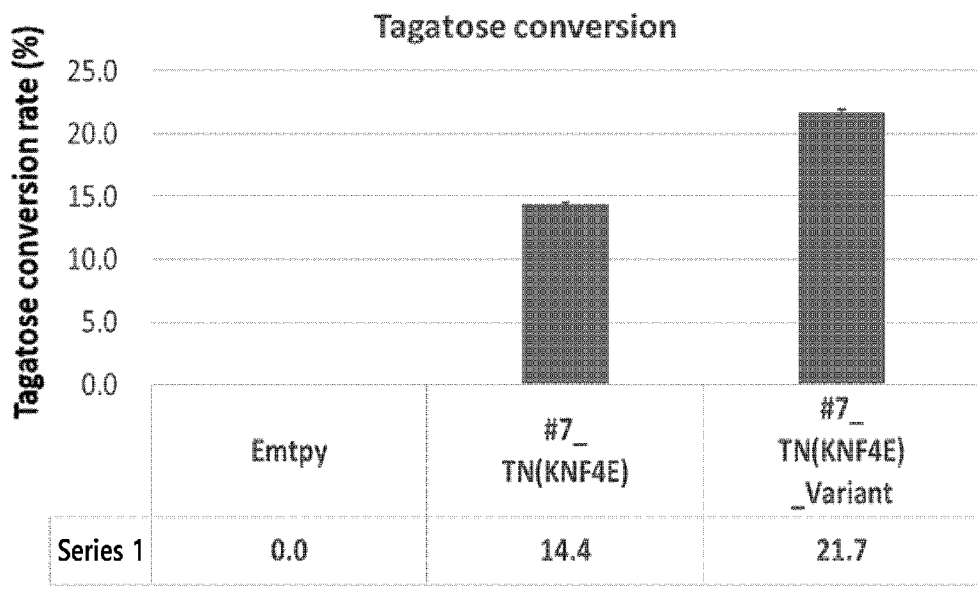

[FIG. 3]
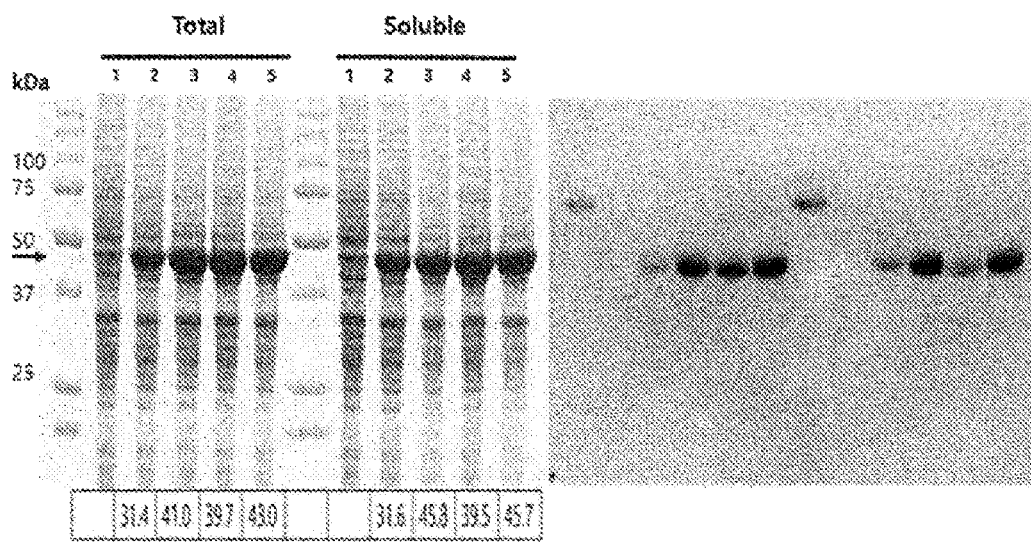
[FIG. 4]
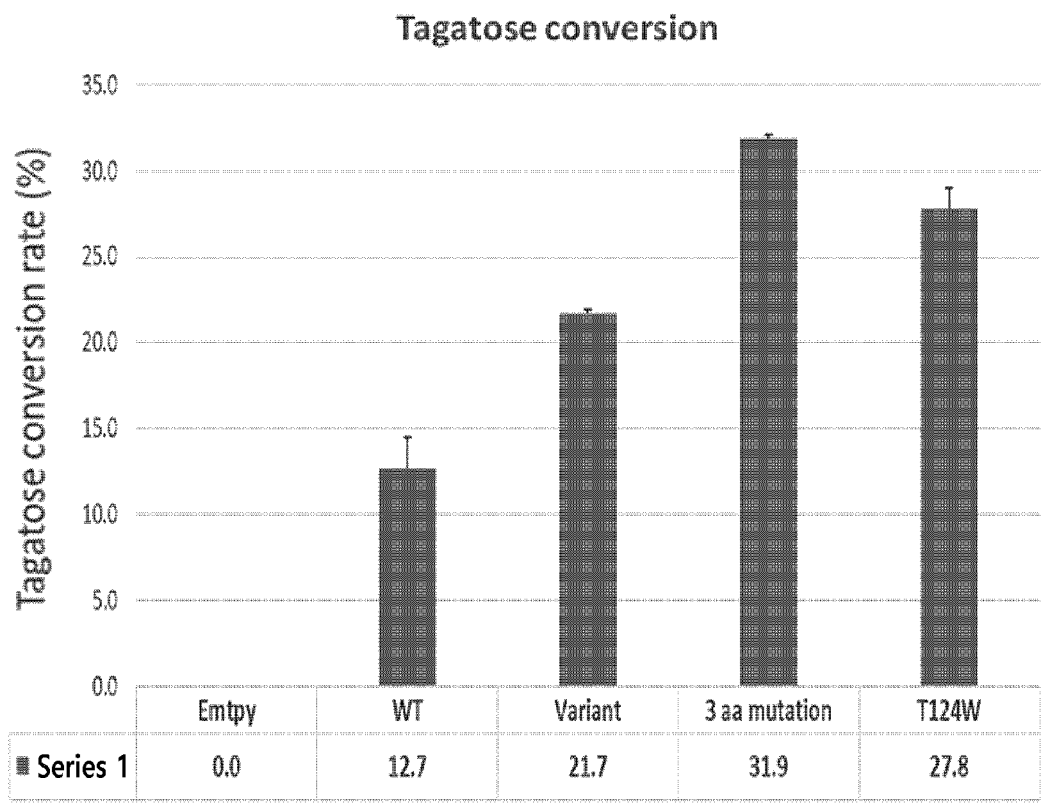

[FIG. 5]
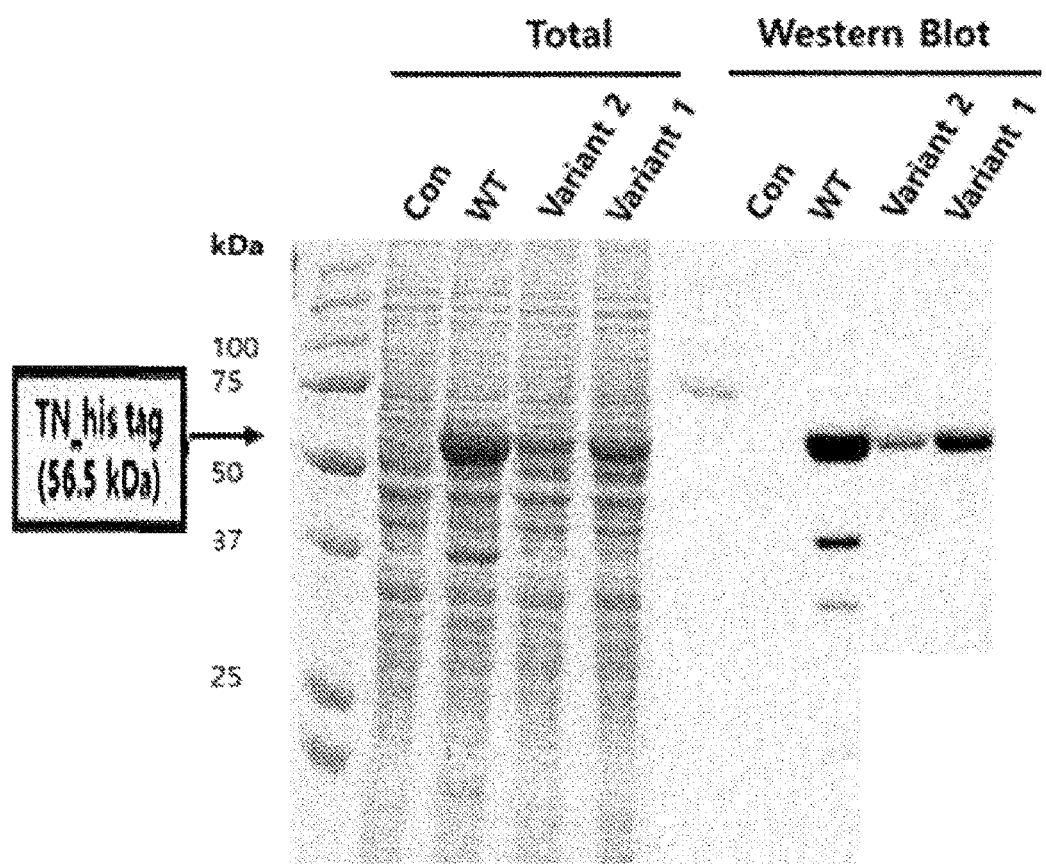

[FIG. 6]
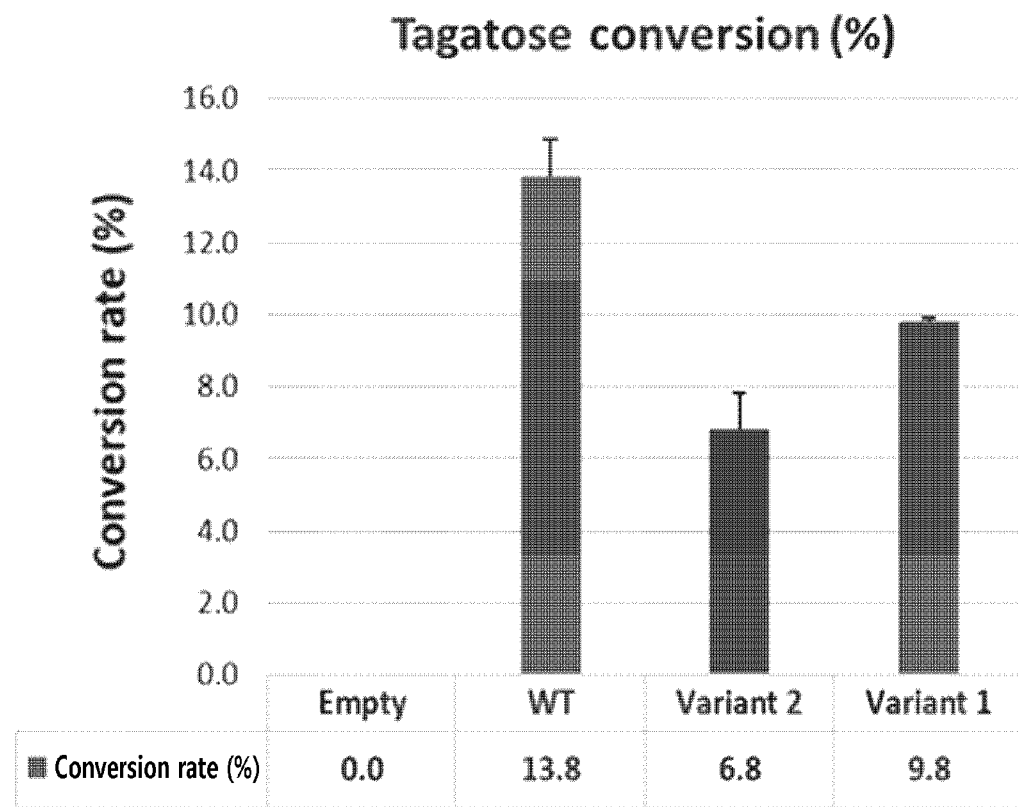

COMPOSITION FOR TAGATOSE PRODUCTION AND METHOD FOR PREPARING TAGATOSE USING SAME

CROSS-REFERENCE TO RELATED APPLICATIONS

The present application is a 35 U.S.C. § 371 national-phase filing of International Application No. PCT/KR2020/000799, filed on Jan. 20, 2021, which claims the benefit of Korean Patent Application No. 10-2020-0007490, filed on Jan. 20, 2020, both of which applications are incorporated herein by reference in their entirety.

INCORPORATION BY REFERENCE

This application contains a sequence listing entitled "059520_00031_ST25.txt," being submitted herein in ASCII format via EFS-Web, which is a copy of the sequence listing as filed in PCT/KR2021/000799, which was modified on Jul. 19, 2022 and is 34,430 bytes in size.

TECHNICAL FIELD

The present disclosure relates to a composition for tagatose production and a method for preparing tagatose using the same.

BACKGROUND ART

Tagatose is a natural sweetener present in a small amount in foods such as milk, cheese, cacao and sweet natural fruits such as apples and tangerines. The calorie of tagatose is 1.5 kcal/g, which is ⅓ that of sugar, and the glycemic index (GI) thereof is 3, which is 5% of that of sugar. However, tagatose exhibits physical properties similar to those of sugar, has a variety of health functions while having a sweet taste similar to that of sugar, and may thus be used in various products as a sugar substitute that can satisfy both health and taste at the same time.

Conventionally known or commonly used methods for preparing tagatose include a chemical method (catalytic reaction) and a biological method (isomerase reaction) using galactose as a main raw material (PCT WO 2006/058092). However, there is a limit to the stable supply of lactose, which is a basic raw material for galactose used as a main raw material in the conventional methods for preparing tagatose, since the price of lactose is unstable depending on the production, demand, and supply of raw milk and lactose in the international market. Hence, there is a demand for a tagatose production system using generalized saccharides (sugar, glucose, fructose, and the like) as raw materials.

Accordingly, a technology for producing tagatose using fructose as a raw material through a cellular reaction based on *Corynebacterium glutamicum* is currently being applied. When fructose is added to a cell that produces tagatose-converting enzyme, fructose is converted into tagatose through a cellular reaction to produce tagatose. In order to increase the efficiency of conversion to tagatose, it is necessary to increase the amount of tagatose-converting enzyme in the cell above all else. For this end, a high-expression system of intracellular tagatose-converting enzyme is absolutely necessary.

DISCLOSURE

Technical Problem

The present inventors have made intensive research efforts to increase the expression of fructose-4-epimerase, which is a tagatose-converting enzyme, and as a result, completed the present disclosure by discovering a mutated polynucleotide of fructose-4-epimerase with significantly increased expression.

Technical Solution

The present disclosure provides a mutated polynucleotide encoding *Kosmotoga olearia*-derived fructose-4-epimerase; or a variant thereof.

The present disclosure provides a vector comprising the mutated polynucleotide.

The present disclosure provides a microorganism of the genus *Corynebacterium* sp. expressing either of *Kosmotoga olearia*-derived fructose-4-epimerase or a variant thereof, the microorganism comprising either of the mutated polynucleotide or a vector including the mutated polynucleotide.

The present disclosure provides a method for producing fructose-4-epimerase, the method comprising culturing a microorganism of the genus *Corynebacterium* sp. including either of the mutated polynucleotide or a vector including the mutated polynucleotide in a medium.

The present disclosure provides a composition for tagatose production, comprising a microorganism of the genus *Corynebacterium* sp. including either of the mutated polynucleotide or a vector including the mutated polynucleotide; or a culture of the microorganism.

The present disclosure provides a method for preparing tagatose, the method comprising bringing a microorganism of the genus *Corynebacterium* sp. including either of the mutated polynucleotide or a vector including the mutated polynucleotide; or a culture of the microorganism into contact with fructose.

The present disclosure provides the use for tagatose production of a microorganism of the genus *Corynebacterium* sp. including either of the mutated polynucleotide or a vector including the mutated polynucleotide.

Advantageous Effects

The mutated polynucleotide of the present disclosure has a significantly higher expression level of fructose-4-epimerase or a variant thereof than the unmutated polynucleotide, and thus the economic efficiency is high when an enzyme is produced from a microorganism including the mutated polynucleotide.

BRIEF DESCRIPTION OF DRAWINGS

FIG. 1 illustrates the expression level of fructose-4-epimerase expressed from a mutated polynucleotide, where E is empty plasmid, WT is #7_H4_KO(KNF4E), and variant is #7_H4_KO(KNF4E) variant;

FIG. 2 illustrates the tagatose conversion rate by fructose-4-epimerase expressed from a mutated polynucleotide;

FIG. 3 illustrates the expression level of a fructose-4-epimerase variant expressed from a mutated polynucleotide, where 1 is Empty, 2 is #7_H4_KO(KNF4E), 3 is #7_H4_KO(KNF4E)_variant, 4 is #7_H4_KO(KNF4E)_variant_3aa mutation (N97Y, T124W, N367V), and 5 is #7_H4_KO(KNF4E)_variant_1aa mutation (T124W);

FIG. 4 illustrates the tagatose conversion rate by a fructose-4-epimerase variant expressed from a mutated polynucleotide;

FIG. 5 illustrates the expression level of a mutated polynucleotide obtained by applying a nucleotide mutation to a *Thermotoga* neapolitana-derived fructose-4-epimerase variant, where Con is empty plasmid, WT is H4_TN_original, variant 2 is H4_TN_variant_2, CJ is mUxaE, and variant 1 is H4_TN_variant_1.

FIG. 6 illustrates the tagatose conversion rate due to a mutated polynucleotide obtained by applying a nucleotide mutation to a *Thermotoga* neapolitana-derived fructose-4-epimerase variant.

BEST MODE FOR IMPLEMENTATION OF THE INVENTION

The present disclosure will be described in detail as follows. Meanwhile, each description and embodiment disclosed in the present disclosure may also be applied to other descriptions and embodiments. That is, all combinations of various elements disclosed in the present disclosure fall within the scope of the present disclosure. Further, the scope of the present disclosure is not limited by the specific description below. Further, those skilled in the art will recognize, or be able to ascertain using no more than routine experimentation, many equivalents to the specific embodiments of the present disclosure described herein. Further, these equivalents should be interpreted to fall within the scope of the present disclosure.

An aspect of the present disclosure for achieving the objects is to provide a mutated polynucleotide encoding *Kosmotoga olearia*-derived fructose-4-epimerase; or a variant thereof.

The mutated polynucleotide may be one in which any one or more polynucleotides encoding amino acids are modified in the polynucleotide encoding fructose-4-epimerase; or a variant thereof, but is not limited thereto. Specifically, the mutated polynucleotide may include any one or more mutations of i) a polynucleotide encoding leucine (L) is selected from the group consisting of CTC, CTG, CTT, and TTG; ii) a polynucleotide encoding isoleucine (I) is selected from the group consisting of ATC and ATT; iii) a polynucleotide encoding threonine (T) is selected from the group consisting of ACT, ACG, and ACC; iv) a polynucleotide encoding arginine (R) is selected from the group consisting of CGT, CGC, and CGG; or v) a polynucleotide encoding glycine (G) is selected from the group consisting of GGC, GGT, and GGA, and may include all of the mutations of i) to v), but is not limited thereto.

Additionally, the mutated polynucleotide may further include any one or more mutations of vi) a polynucleotide encoding valine (V) is selected from the group consisting of GTA, GTC, GTG, and GTT; vii) a polynucleotide encoding serine(S) is selected from the group consisting of TCA, TCT, TCC, and AGC; viii) a polynucleotide encoding alanine (A) is selected from the group consisting of GCG, GCT, GCC, and GCA; or ix) a polynucleotide encoding glutamine (Q) is selected from the group consisting of CAG and CAA, but is not limited thereto.

More specifically, the mutated polynucleotide may include any one or more mutations of i) a polynucleotide encoding leucine (L) is selected from the group consisting of CTC, CTG, CTT, and TTG; ii) a polynucleotide encoding isoleucine (I) is selected from the group consisting of ATC and ATT; iii) a polynucleotide encoding threonine (T) is selected from the group consisting of ACT, ACG, and ACC; iv) a polynucleotide encoding arginine (R) is selected from the group consisting of CGT, CGC, and CGG; v) a polynucleotide encoding glycine (G) is selected from the group consisting of GGC, GGT, and GGA; vi) a polynucleotide encoding valine (V) is selected from the group consisting of GTA, GTC, GTG, and GTT; vii) a polynucleotide encoding serine(S) is selected from the group consisting of TCA, TCT, TCC, and AGC; viii) a polynucleotide encoding alanine (A) is selected from the group consisting of GCG, GCT, GCC, and GCA; or ix) a polynucleotide encoding glutamine (Q) is selected from the group consisting of CAG and CAA, but is not limited thereto.

The mutated polynucleotide may be introduced into and expressed in a microorganism of the genus *Corynebacterium* sp. Specifically, in the microorganism of the genus *Corynebacterium* sp. into which the mutated polynucleotide is introduced, the expression level of fructose-4-epimerase expressed in the microorganism or the amount of tagatose produced may increase. More specifically, the expression level of fructose-4-epimerase and the amount of tagatose produced may increase compared to those in a microorganism of the genus *Corynebacterium* sp. into which the mutated polynucleotide is not introduced, namely, a microorganism of the genus *Corynebacterium* sp. into which an unmutated polynucleotide is introduced or a wild-type microorganism of the genus *Corynebacterium* sp.

In general, there is a nucleic acid sequence encoding an amino acid for each microorganism. For example, in a wild-type protein derived from a microorganism of the genus *Kosmotoga*, the nucleic acid sequence of SEQ ID NO: 1 is translated into the amino acid sequence of SEQ ID NO: 2.

Accordingly, in the present disclosure, the gene encoding a wild-type protein derived from a microorganism of the genus *Kosmotoga* is mutated so that translation is properly performed in a microorganism of the genus *Corynebacterium* sp. The mutation may be any one or more, for example, selected from the group consisting of mutation of TTT, a polynucleotide encoding phenylalanine (F), to TTC, and mutation of TTC to TTT; selected from the group consisting of mutation of TTG, a polynucleotide encoding leucine (L), to CTC, mutation of CTT to CTC, mutation of TTG to CTG, mutation of CTT to CTG, mutation of CTA to CTG, mutation of TTG to CTT, mutation of CTC to CTT, mutation of TTA to CTT, mutation of CTT to TTG, mutation of CTG to TTG, mutation of CTC to TTG, mutation of CCT to TTG, and mutation of TTA to TTG; selected from the group consisting of mutation of ATT, a polynucleotide encoding isoleucine (I), to ATC, mutation of ATA to ATC, mutation of ATC to ATT, and mutation of ATA to ATT; selected from the group consisting of mutation of GTT, a polynucleotide encoding valine (V), to GTA, mutation of GTC to GTA, mutation of GTT to GTC, mutation of GTA to GTC, mutation of GTA to GTG, mutation of GTT to GTG, and mutation of GTA to GTT; selected from the group consisting of mutation of AGC, a polynucleotide encoding serine(S), to TCA, mutation of TCT to TCA, mutation of AGC to TCT, mutation of AGC to TCC, mutation of AGT to TCC, mutation of TCA to TCC, mutation of TCT to TCC, mutation of TCA to AGC, and mutation of TCG to AGC; selected from the group consisting of mutation of TAT, a polynucleotide encoding tyrosine (Y), to TAC and mutation of TAC to TAT; selected from the group consisting of mutation of CAT, a polynucleotide encoding histidine (H), to CAC and mutation of CAC to CAT; selected from the group consisting of mutation of CAA, a polynucleotide encoding glutamine (Q), to CAG; selected from the group consisting of mutation of AAT, a polynucleotide encoding asparagine (N), to AAC and mutation of AAC to AAT; selected from the group consisting of mutation of AAG, a polynucleotide encoding lysine (K), to AAA and mutation of AAA to AAG; selected from the group consisting of mutation of GAT, a polynucleotide encoding aspartic acid (D), to GAC and mutation of GAC to GAT; selected from the group consisting of mutation of GAA, a polynucleotide encoding glutamic acid (E), to GAG and mutation of GAG to GAA; selected from the group consisting of mutation of TGC, a polynucleotide encoding cysteine (C), to TGT and mutation of TGT to TGC; selected from the group consisting of mutation of AGA, a polynucleotide encoding arginine (R), to CGT, mutation of AGG to CGT, mutation of CGA to CGT, mutation of AGA to CGC, mutation of CGA to CGC, mutation of CGG to CGC, mutation of CGT to CGC, mutation of AGA to CGG, mutation of CGA to CGG, and mutation of CGT to CGG; selected from the group consisting of mutation of mutation of GGA, a polynucleotide encoding glycine (G), to GGC, mutation of GGG to GGC, mutation of GGT to GGC, mutation of GGA to GGT, mutation of GGC to GGT, mutation of GGG to GGT, mutation of GGC to GGA, mutation of GGG to GGA, and mutation of GGT to GGA; selected from the group consisting of mutation of CCA, a polynucleotide encoding proline (P), to CCC, mutation of CCG to CCC, mutation of CCT to CCC, mutation of CCA to CCT, mutation of CCC to CCT, mutation of CCG to CCT, mutation of CCC to CCG, mutation of CCG to CCA, and mutation of CCT to CCA; selected from the group consisting of mutation of ACA, a polynucleotide encoding threonine (T), to ACT, mutation of ACA to ACG, mutation of ACT to ACC, and mutation of ACA to ACC; or selected from the group consisting of mutation of GCA, a polynucleotide encoding alanine (A), to GCT, mutation of GCC to GCT, mutation of GCG to GCT, mutation of GCG to GCC, mutation of GCA to GCC, mutation of GCT to GCC, mutation of GCC to GCA, mutation of GCG to GCA, and mutation of GCT to GCA, but is not limited thereto.

As used herein, the term "polynucleotide" refers to a DNA or RNA strand of a certain length or longer as a polymer of nucleotides in which nucleotide monomers are covalently linked in a long chain shape.

As used herein, the term "mutated polynucleotide" refers to a polynucleotide mutated by substituting any one or more nucleotides constituting the polynucleotide with other nucleotides. The mutated polynucleotide may be used interchangeably with terms such as mutant polynucleotide and polynucleotide mutated enzyme.

As used herein, the term "fructose-4-epimerase" refers to an enzyme exhibiting fructose-4-epimerization activity that epimerizes the 4th carbon position of fructose to convert fructose into tagatose. For the purposes of the present disclosure, fructose-4-epimerase may include any enzyme without limitation as long as it is an enzyme capable of producing tagatose using fructose as a substrate, and may be used interchangeably with "D-fructose C4-epimerase". As an example, tagatose-bisphosphate aldolase or tagatose-bisphosphate aldolase class II accessory protein, EC 4.1.2.40, in KEGG (Kyoto Encyclopedia of Genes and Genomes), a known database, may be included in fructose-4-epimerase as long as it exhibits the activity of converting fructose as a substrate into tagatose. The tagatose-bisphosphate aldolase is known as an enzyme for producing glycerone phosphate and D-glyceraldehyde 3-phosphate using D-tagatose 1,6-bisphosphate as a substrate as presented in [Scheme 1] below.

[Scheme 1]

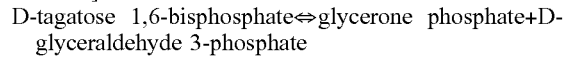

D-tagatose 1,6-bisphosphate⇔glycerone phosphate+D-glyceraldehyde 3-phosphate

As an example, tagatose-6-phosphate kinase (EC 2.7.1.144) may be included in fructose-4-epimerase as long as it exhibits the activity of converting fructose as a substrate into tagatose. The tagatose-6-phosphate kinase is known as an enzyme for producing ADP and D-tagatose 1,6-bisphosphate using ATP and D-tagatose 6-phosphate as substrates as presented in [Scheme 2] below.

[Scheme 2]

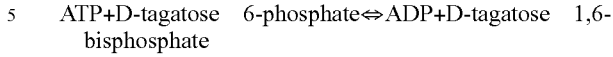

ATP+D-tagatose 6-phosphate⇔ADP+D-tagatose 1,6-bisphosphate

With regard to the activity of fructose-4-epimerase, the conversion rate from fructose as a substrate into tagatose (conversion rate=tagatose weight/initial fructose weight× 100) may be 0.01% or more, specifically 0.1% or more, more specifically 0.3% or more. More specifically, the conversion rate may be in a range of 0.01% to 100% or a range of 0.1% to 50%, but is not limited thereto.

The polynucleotide encoding fructose-4-epimerase of the present disclosure may include the nucleic acid sequence of SEQ ID NO: 1, may specifically consist essentially of the nucleic acid sequence of SEQ ID NO: 1, and may more specifically consist of the nucleic acid sequence of SEQ ID NO: 1, but is not limited thereto.

SEQ ID NO: 1 is a nucleic acid sequence encoding fructose-4-epimerase, and the nucleic acid sequence of SEQ ID NO: 1 may include a polynucleotide consisting of a nucleic acid sequence having 80%, 85%, 90%, 95%, 96%, 97%, 98%, or 99% or more homology or identity thereto. It is apparent that a polynucleotide consisting of a nucleic acid sequence in which some sequences are deleted, modified, substituted or added is also included within the scope of the nucleic acid sequence of SEQ ID NO: 1 of the present disclosure as long as the nucleic acid sequence has such homology or identity and exhibits efficacy corresponding to SEQ ID NO: 1.

In other words, even when it is described as "polynucleotide consisting of a nucleic acid sequence represented by a specific SEQ ID NO" or "polynucleotide having a nucleic acid sequence represented by a specific SEQ ID NO" in the present disclosure, it is apparent that a polynucleotide consisting of a nucleic acid sequence in which some sequences are deleted, modified, substituted or added may also be used in the present disclosure as long as it exhibits activity the same as or corresponding to that of the polynucleotide consisting of the nucleic acid sequence of the corresponding SEQ ID NO. For example, it is apparent that a "polynucleotide consisting of the nucleic acid sequence of SEQ ID NO: 1" may belong to a "polynucleotide consisting of the nucleic acid sequence of SEQ ID NO: 1" as long as it exhibits activity the same as or corresponding to that of the polynucleotide.

The fructose-4-epimerase of the present disclosure may include an amino acid sequence of SEQ ID NO: 2, may specifically consist essentially of the amino acid sequence of SEQ ID NO: 2, and may more specifically consist of the amino acid sequence of SEQ ID NO: 2, but is not limited thereto.

SEQ ID NO: 2 is an amino acid sequence encoding fructose-4-epimerase, and the amino acid sequence of SEQ ID NO: 2 may include a polypeptide consisting of an amino acid sequence having 80%, 85%, 90%, 95%, 96%, 97%, 98%, or 99% or more homology or identity thereto. It is apparent that a polypeptide consisting of an amino acid sequence in which some sequences are deleted, modified, substituted or added is also included within the scope of the amino acid sequence of SEQ ID NO: 2 of the present disclosure as long as the amino acid sequence has such homology or identity and exhibits efficacy corresponding to SEQ ID NO: 2.

The Kosmotoga olearia-derived fructose-4-epimerase variant of the present disclosure may be one in which any one or more amino acids in the amino acid sequence of *Kosmotoga olearia*-derived fructose-4-epimerase are substituted and fructose-4-epimerase activity is exhibited, but is not limited thereto. The amino acid substitution may be specifically substitution of 1 to 20 amino acids, 1 to 15 amino acids, 1 to 12 amino acids, 1 to 10 amino acids amino acids, 1 to 9 amino acids, or 1 to 7 amino acids. As an example, the amino acid substitution may include any one or more substitutions selected from the group consisting of a) substitution of an amino acid corresponding to position 97 with tyrosine (Y), b) substitution of an amino acid corresponding to position 124 with tryptophan (W), and c) substitution of an amino acid corresponding to position 367 with valine (V), but is not limited thereto.

As used herein, the term "enzyme variant" refers to a protein in which functions or properties of the protein are maintained while one or more amino acids differ from the recited sequence in conservative substitution and/or modification. The enzyme variant differs from the identified sequence by several amino acid substitutions, deletions or additions. Such an enzyme variant may generally be identified by modifying one or more amino acids in the amino acid sequence of the protein and evaluating the properties of the modified protein. In other words, the ability of the enzyme variant may be increased, unchanged, or decreased compared to that of the native protein. Some enzyme variants may include enzyme variants in which one or more portions, such as an N-terminal leader sequence or a transmembrane domain, are removed. Other enzyme variants may include enzyme variants in which a portion is removed from the N- and/or C-terminus of the mature protein. For the term "enzyme variant", modification, modified protein, modified polypeptide, mutant, mutein, divergent, variant and the like may be used, and the enzyme variant is not limited thereto as long as it is a term used in a mutated sense.

For the purposes of the present disclosure, in the enzyme variant, the activity of the modified protein may be increased compared to that of a wild-type or unmodified protein occurring in nature, but the enzyme variant is not limited thereto.

As used herein, the term "conservative substitution" means to substitute one amino acid with another amino acid exhibiting similar structural and/or chemical properties. The enzyme variant may have, for example, one or more conservative substitutions while still retaining one or more biological activities. Such amino acid substitutions may generally occur based on similarity in polarity, charge, solubility, hydrophobicity, hydrophilicity and/or amphipathic nature of residues. For example, among electrically charged amino acids, positively charged (basic) amino acids include arginine, lysine, and histidine and negatively charged (acidic) amino acids include glutamic acid and aspartic acid. Among uncharged amino acids, nonpolar amino acids include glycine, alanine, valine, leucine, isoleucine, methionine, phenylalanine, tryptophan and proline and polar or hydrophilic amino acids include serine, threonine, cysteine, tyrosine, asparagine and glutamine, and aromatic amino acids among the nonpolar amino acids include phenylalanine, tryptophan and tyrosine.

The enzyme variant may include deletions or additions of amino acids that have minimal influence on the secondary structure and properties of the polypeptide. For example, the polypeptide may be conjugated with a signal (or leader) sequence at the N-terminus of the protein involved in the transfer of the protein either co-translationally or post-translationally. The polypeptide may be conjugated with other sequences or linkers to enable identification, purification, or synthesis of the polypeptide.

The "substitution with another amino acid" is not limited as long as the amino acid is an amino acid different from the amino acid before the substitution. In other words, the substitution with another amino acid is not limited as long as asparagine (N), an amino acid corresponding to position 97 of the amino acid sequence of SEQ ID NO: 2, is substituted with an amino acid residue other than asparagine, threonine (T), an amino acid corresponding to position 124, is substituted with an amino acid residue other than threonine, or asparagine (N), an amino acid corresponding to position 367, is substituted with an amino acid residue other than asparagine. In the present disclosure, when it is expressed that "a specific amino acid is substituted", it is apparent that the amino acid is substituted with an amino acid different from the amino acid before the substitution even if it is not separately indicated that the amino acid is substituted with another amino acid.

The enzyme variant may be one in which one or more amino acids among the amino acids corresponding to positions 97, 124, and 367 in the amino acid sequence of SEQ ID NO: 2 are substituted with amino acids different from the amino acids before substitution. Alternatively, the enzyme variant may be an enzyme variant that has an uncharged amino acid and is substituted with an amino acid different from the amino acid before substitution, but is not limited thereto.

Specifically, the enzyme variant may be an enzyme variant including any one or more substitutions selected from the group consisting of a) substitution of the amino acid corresponding to position 97 with another amino acid, b) substitution of the amino acid corresponding to position 124 with another amino acid, and c) substitution of the amino acid corresponding to position 367 with another amino acid in the amino acid sequence of SEQ ID NO: 2. More specifically, the enzyme variant may be one in which a) the amino acid corresponding to position 97 is substituted with tyrosine (Y), b) the amino acid corresponding to position 124 is substituted with tryptophan (W), and c) the amino acid corresponding to position 367 is substituted with valine (V).

The fructose-4-epimerase variant provided in the present disclosure may refer to an enzyme variant in which an amino acid at a specific position in the protein having fructose-4-epimerization ability described above is substituted and thus fructose-4-epimerization ability is exhibited or the activity and/or stability of fructose-4-epimerization ability is increased compared to that of the protein before mutation.

The enzyme variant may include the amino acid sequence of SEQ ID NO: 5 or SEQ ID NO: 7, but is not limited thereto.

The enzyme variant may include substitution of an amino acid corresponding to position 97, 124, or 367 in SEQ ID NO: 2 with another amino acid, have at least 80%, 90%, 95%, 96%, 97%, 98%, or 99% or more, or 100% sequence homology to the amino acid sequence of SEQ ID NO: 5 or SEQ ID NO: 7, and exhibit fructose-4-epimerization activity.

The enzyme variant may include the amino acid sequence of SEQ ID NO: 5 or SEQ ID NO: 7 or an amino acid sequence that has 80% or more homology or identity to the amino acid sequence and has one or more amino acids fixed among the amino acids corresponding to positions 97, 124, and 367 in the amino acid sequence, but is not limited thereto. Specifically, the enzyme variant of the present disclosure may include a polypeptide having at least 80%, 90%, 95%, 96%, 97%, 98%, or 99% or more homology or identity to the amino acid sequence of SEQ ID NO: 5 or SEQ ID NO: 7. It is apparent that a protein having an amino acid sequence in which some sequences are deleted, modified, substituted or added in addition to the amino acid corresponding to position 97, 124, or 367 is also included within the scope of the present disclosure as long as the amino acid sequence has such homology or identity and exhibits efficacy corresponding to that of the protein.

The mutated polynucleotide of the present disclosure may be one in which any one or more polynucleotides encoding single amino acids are mutated in the nucleic acid sequence of SEQ ID NO: 1 encoding fructose-4-epimerase or the nucleic acid sequence encoding the fructose-4-epimerase variant in which any one or more amino acids are substituted in the amino acid sequence of fructose-4-epimerase, but is not limited thereto. Specifically, the mutation may include any one or more mutations of i) the polynucleotide encoding leucine (L) is selected from the group consisting of CTC, CTG, CTT, and TTG; ii) the polynucleotide encoding isoleucine (I) is selected from the group consisting of ATC and ATT; iii) the polynucleotide encoding valine (V) is selected from the group consisting of GTA, GTC, GTG, and GTT; iv) the polynucleotide encoding serine(S) is selected from the group consisting of TCA, TCT, TCC, and AGC; v) the polynucleotide encoding threonine (T) is selected from the group consisting of ACT, ACG, and ACC; vi) the polynucleotide encoding alanine (A) is selected from the group consisting of GCT, GCC, and GCA; vii) the polynucleotide encoding glutamine (Q) is selected from CAG; viii) the polynucleotide encoding arginine (R) is selected from the group consisting of CGT, CGC, and CGG; or ix) the polynucleotide encoding glycine (G) is selected from the group consisting of GGC, GGT, and GGA, but is not limited thereto.

The polynucleotide mutation is not particularly limited as long as it is performed within a range in which only the codon is altered but the sequence of the amino acid encoding fructose-4-epimerase is not altered. Specifically, in the nucleic acid sequence of SEQ ID NO: 1, i) the polynucleotide encoding leucine (L) at any one or more of positions 6, 12, 36, 47, 82, 89, 94, 126, 128, 134, 145, 156, 157, 159, 172, 209, 219, 253, 278, 289, 295, 299, 306, 313, 320, 333, 352, 359, 362, 368, 378, 382, 389, 391, 407, 408, 415, 422, and 424 may be selected from the group consisting of CTC, CTG, CTT, and TTG and mutated; ii) the polynucleotide encoding isoleucine (I) at any one or more of positions 9, 17, 32, 48, 76, 80, 87, 88, 112, 115, 150, 178, 195, 227, 242, 257, 263, 288, 309, 379, 387, 392, 403, 413, 416, and 420 may be selected from the group consisting of ATC and ATT and mutated; iii) the polynucleotide encoding threonine (T) at any one or more of positions 34, 35, 44, 45, 51, 62, 65, 154, 180, 198, 206, 210, 254, 270, 274, 296, 317, 373, 380, 384, 390, 421, and 431 may be selected from the group consisting of ACT, ACG, and ACC and mutated; iv) the polynucleotide encoding arginine (R) at any one or more of positions 29, 70, 109, 116, 133, 153, 163, 173, 205, 225, 247, 249, 251, 300, 330, 348, 351, 354, 361, 363, 372, 404, 409, and 419 may be selected from the group consisting of CGT, CGC, and CGG and mutated; v) the polynucleotide encoding glycine (G) at any one or more of positions 16, 20, 43, 59, 60, 63, 81, 90, 91, 95, 101, 122, 139, 170, 179, 186, 187, 192, 218, 224, 234, 238, 267, 285, 292, 319, 345, and 406 may be selected from the group consisting of GGC, GGT, and GGA and mutated; vi) the polynucleotide encoding valine (V) at any one or more of positions 10, 21, 24, 31, 46, 55, 73, 149, 175, 177, 182, 197, 200, 207, 226, 229, 230, 231, 235, 264, 282, 286, 291, 325, 327, 328, 371, 375, and 423 may be selected from the group consisting of GTA, GTC, GTG, and GTT and mutated; vii) the polynucleotide encoding serine(S) at any one or more of positions 11, 23, 26, 75, 104, 131, 168, 171, 194, 199, 269, 307, 308, 322, 357, 393, and 414 may be selected from the group consisting of TCA, TCT, TCC, and AGC and mutated; viii) the polynucleotide encoding alanine (A) at any one or more of positions 27, 39, 50, 67, 77, 107, 111, 119, 121, 130, 135, 151, 155, 161, 164, 169, 188, 213, 222, 228, 250, 256, 275, 277, 287, 294, 298, 302, 305, 331, 353, 374, and 430 may be selected from the group consisting of GCG, GCT, GCC, and GCA and mutated; and ix) the polynucleotide encoding glutamine (Q) at any one or more of positions 7, 13, 15, 54, 57, 102, 106, 189, 201, 232, and 273 may be selected from the group consisting of CAG and CAA and mutated, but the polynucleotide mutation is not limited thereto.

When any one or more amino acids selected from the group consisting of threonine (T), aspartic acid (D), serine (S) and glutamic acid (E) in the amino acid sequence constituting the enzyme are consecutively arranged as two identical amino acids, the polynucleotide encoding the first amino acid and the polynucleotide encoding the second amino acid among the identical amino acids may not be identical to each other, but are not limited thereto.

When any one or more amino acids selected from the group consisting of proline (P) and valine (V) in the amino acid sequence constituting the enzyme are consecutively arranged as three or more identical amino acids, polynucleotides encoding at least two amino acids among the respective polynucleotides encoding the identical amino acids may be identical to each other, but are not limited thereto.

In the fructose-4-epimerase variant including any one or more substitutions selected from the group consisting of a) substitution of the amino acid corresponding to position 97 with tyrosine (Y), b) substitution of the amino acid corresponding to position 124 with tryptophan (W), and c) substitution of the amino acid corresponding to position 367 with valine (V) in the amino acid sequence of SEQ ID NO: 2, the polynucleotide encoding tyrosine (Y) at position 97 may be TAC, the polynucleotide encoding tryptophan (W) at position 124 may be TGG, and the polynucleotide encoding valine (V) at position 367 may be GTT, but the fructose-4-epimerase variant is not limited thereto.

The mutated polynucleotide may have any one or more nucleic acid sequences selected from the group consisting of SEQ ID NO: 3, SEQ ID NO: 4, and SEQ ID NO: 6, but is not limited thereto.

The nucleic acid sequence of SEQ ID NO: 3 may encode the amino acid sequence of SEQ ID NO: 2 constituting the fructose-4-epimerase, the nucleic acid sequence of SEQ ID NO: 4 may encode the amino acid sequence of SEQ ID NO: 5 constituting the fructose-4-epimerase variant, and the nucleic acid sequence of SEQ ID NO: 6 may encode the amino acid sequence of SEQ ID NO: 7 constituting the fructose-4-epimerase variant, but are not limited thereto.

Specifically, the nucleic acid sequences of SEQ ID NO: 4 and SEQ ID NO: 6 may be substituted with a proper base so as to achieve any one or more amino acid substitutions selected from the group consisting of a) substitution of the amino acid corresponding to position 97 with tyrosine (Y), b) substitution of the amino acid corresponding to position 124 with tryptophan (W), and c) substitution of the amino acid corresponding to position 367 with valine (V) in the amino acid sequence of *Kosmotoga olearia*-derived fructose-4-epimerase, which is encoded by the nucleic acid sequence of SEQ ID NO: 3, but are not limited thereto. The substitution with an appropriate base may be substitution of the polynucleotide encoding tyrosine (Y) at position 97 with TAC, substitution of the polynucleotide encoding tryptophan (W) at position 124 with TGG, and substitution of the polynucleotide encoding valine (V) at position 367 with GTT as described above, but is not limited thereto.

The amino acid sequence of *Kosmotoga olearia*-derived fructose-4-epimerase, which is encoded by the nucleic acid sequence of SEQ ID NO: 3, may be translated into the amino acid sequence of SEQ ID NO: 2, but is not limited thereto.

The mutated polynucleotide in the present disclosure is defined as having any one or more nucleic acid sequences selected from the group consisting of SEQ ID NO: 3, SEQ ID NO: 4 and SEQ ID NO: 6, but does not exclude the addition of meaningless sequences before and after the nucleic acid sequence of SEQ ID NO: 3, SEQ ID NO: 4 or SEQ ID NO: 6 or mutations that may occur naturally or silent mutations thereof, and it is apparent to those skilled in the art that a polynucleotide corresponds to the mutated polynucleotide of the present disclosure as long as it exhibits activity the same as or corresponding to that of a polynucleotide including the nucleic acid sequence of SEQ ID NO: 3, SEQ ID NO: 4 or SEQ ID NO: 6. As a specific example, the mutated polynucleotide of the present disclosure may be a polynucleotide consisting of the nucleic acid sequence of SEQ ID NO: 3, SEQ ID NO: 4 or SEQ ID NO: 6 or a nucleic acid sequence having 80%, 85%, 90%, 95%, 96%, 97%, 98%, or 99% or more homology or identity to the nucleic acid sequences. It is apparent that a polynucleotide consisting of a nucleic acid sequence in which some sequences are deleted, modified, substituted or added is also included in the scope of the mutated polynucleotide of the present disclosure as long as the nucleic acid sequence has such homology or identity and exhibits efficacy corresponding to that of the mutated polynucleotide.

The mutated polynucleotide may include any polynucleotide sequence encoding a protein exhibiting the activity of fructose-4-epimerase by hybridizing with a probe that may be prepared from a known gene sequence, for example, a complementary sequence to all or part of the nucleic acid sequence constituting the mutated polynucleotide under stringent conditions without limitation. The "stringent condition" means a condition that enables specific hybridization between polynucleotides. These conditions are specifically described in literatures (for example, J. Sambrook et al., *Molecular Cloning, A Laboratory Manual*, 2nd Edition, Cold Spring Harbor Laboratory press, Cold Spring Harbor, New York, 1989; F. M. Ausubel et al., *Current Protocols in Molecular Biology*, John Wiley & Sons, Inc., New York). Examples thereof include a condition in which genes having high homology or identity, namely, genes having 70% or more, 80% or more, specifically 85% or more, specifically 90% or more, more specifically 95% or more, still more specifically 97% or more, particularly specifically 99% or more homology or identity hybridize with each other and genes having homology or identity lower than this do not hybridize with each other, or a condition in which washing is performed one time, specifically 2 to 3 times at a salt concentration and temperature corresponding to 60° C., 1×SSC, and 0.1% SDS, specifically 60° C., 0.1×SSC, and 0.1% SDS, more specifically 68° C., 0.1×SSC, and 0.1% SDS, which are the washing conditions of conventional southern hybridization.

Hybridization requires that two polynucleotides have complementary sequences although mismatch between bases is possible depending on the stringency of hybridization. The term "complementary" is used to describe the relation between nucleotide bases capable of hybridizing with each other. For example, with regard to DNA, adenosine is complementary to thymine and cytosine is complementary to guanine. Hence, the present disclosure may also include isolated polynucleotide fragments that are complementary to substantially similar polynucleotide sequences as well as the entire sequence.

Specifically, polynucleotides having homology or identity may be detected using hybridization conditions including a hybridization step at a $T_m$ value of 55° C. and the above-described conditions. The $T_m$ value may be 60° C., 63° C., or 65° C., but is not limited thereto and may be appropriately adjusted by those skilled in the art depending on the purpose.

The appropriate stringency for hybridizing polynucleotides depends on the length and degree of complementarity of the polynucleotides, and the parameters are well known in the art.

As used herein, the term "homology" or "identity" means the degree to which two given amino acid sequences or nucleic acid sequences are related to each other and may be expressed as a percentage. The terms "homology" and "identity" may often be used interchangeably.

The sequence homology or identity of conserved polynucleotides or polypeptides is determined by standard alignment algorithms, and a default gap penalty established by the program being used may be used together. Substantially, homologous or identical sequences may hybridize with each other to generally about 50%, 60%, 70%, 80%, or 90% or more of the entire sequence or full-length sequence under moderate or high stringent conditions. For hybridization, polynucleotides containing degenerate codons instead of codons are also considered in the polynucleotides.

Whether arbitrary two polynucleotide or polypeptide sequences have homology, similarity, or identity may be determined, for example, using default parameters as in Pearson et al. (1988) *Proc. Natl. Acad. Sci. USA* 85:2444 and known computer algorithms such as the "FASTA" program. Alternatively, the Needleman-Wunsch algorithm (Needleman and Wunsch, 1970, *J. Mol. Biol.* 48:443-453) as performed in the Needleman program of the EMBOSS package (EMBOSS: The European Molecular Biology Open Software Suite, Rice et al., 2000, *Trends Genet.* 16:276-277) (version 5.0.0 or later) may be used to determine the homology, similarity, or identity (including GCG program package (Devereux, J. et al., *Nucleic Acids Research* 12:387 (1984)), BLASTP, BLASTN, FASTA (Atschul, S. F. et al., *J MOLEC BIOL* 215:403 (1990); *Guide to Huge Computers*, Martin J. Bishop, ED., Academic Press, San Diego, 1994, and CARILLO et al. (1988) *SIAM J Applied Math* 48:1073). For example, BLAST from the National Center for Biotechnology Information, or ClustalW may be used to determine the homology, similarity, or identity.

The homology, similarity or identity of polynucleotides or polypeptides may be determined by comparing the sequence information, for example, using a GAP computer program such as Needleman et al. (1970), *J Mol Biol.* 48:443, for example, as known in Smith and Waterman, *Adv. Appl. Math* (1981) 2:482. In summary, the homology, similarity, or identity may be defined as the value acquired by dividing the number of similarly arranged symbols (namely, nucleotides or amino acids) by the total number of symbols in the shorter of the two sequences in a GAP program. Default parameters for the GAP program may include (1) binary comparison matrix (containing values of 1 for identity and 0 for non-identity) and weighted comparison matrix of Gribskov et al. (1986) *Nucl. Acids Res.* 14:6745 (or EDNAFULL (EMBOSS version of NCBI NUC4.4) substitution matrix) as disclosed by Schwartz and Dayhoff, eds., *Atlas Of Protein Sequence And Structure*, National Biomedical Research Foundation, pp. 353-358 (1979); (2) a penalty of 3.0 for each gap and an additional penalty of 0.10 for each symbol in each gap (or a gap opening penalty of 10, a gap extension penalty of 0.5); and (3) no penalty for an end gap. Hence, as used herein, the term "homology" or "identity" refers to relatedness between sequences.

Another aspect of the present disclosure is to provide a vector comprising the mutated polynucleotide of the present disclosure.

The mutated polynucleotide is as described above.

As used herein, the term "vector" refers to a DNA preparation containing the nucleic acid sequence of a polynucleotide encoding a target polypeptide, operably linked to a suitable control sequence so that the target polypeptide can be expressed in a suitable host. The control sequence may include a promoter capable of initiating transcription, an arbitrary operator sequence for controlling such transcription, a sequence encoding a suitable mRNA ribosome binding site, and a sequence for controlling the termination of transcription and translation. After being transformed into a proper host cell, the vector may be replicated or function independently of the host genome and may be integrated into the genome itself.

The vector may be in a form in which the mutated polynucleotide of the present disclosure is operably linked.

As used herein, the term "operably linked" generally means that the base expression control sequence and the nucleic acid sequence encoding the target protein are operably linked to perform a function, thereby affecting the expression of the encoding nucleic acid sequence. An operable linkage with the vector may be constructed using genetic recombination techniques known in the art, and site-specific DNA cleavage and ligation may be constructed using cleavage and ligation enzymes and the like in the art.

The vector used in the present disclosure is not particularly limited, and an arbitrary vector known in the art may be used. Examples of commonly used vectors include plasmids, cosmids, viruses and bacteriophages in a natural or recombinant state. For example, pWE15, M13, MBL3, MBL4, IXII, ASHII, APII, t10, t11, Charon4A, Charon21A and the like may be used as a phage vector or cosmid vector, and pHCP (Korean Patent Publication No. 10-2018-0092110), a pBR system, a pUC system, a pBluescript II system, a pGEM system, a pTZ system, a pCL system, a pET system and the like may be used as a plasmid vector. Specifically, pDZ, pACYC177, pACYC184, pCL, pECCG117, pUC19, pBR322, pMW118, and pCC1BAC vectors and the like may be used.

As an example, a polynucleotide encoding a target polypeptide may be inserted into a chromosome through a vector for intracellular chromosome insertion. Insertion of the polynucleotide into a chromosome may be performed by an arbitrary method known in the art, for example, homologous recombination, but is not limited thereto. The vector may further include a selection marker for determining whether the polynucleotide is inserted into a chromosome. The selection marker is used to select cells transformed with the vector, that is, to confirm whether a target nucleic acid molecule is inserted, and markers that impart selectable phenotypes such as drug resistance, auxotrophy, resistance to cytotoxic agents or expression of surface polypeptide may be used. In an environment treated with a selective agent, only cells expressing the selection marker survive or exhibit other expression traits, and thus transformed cells may be selected.

Another aspect of the present disclosure is to provide a microorganism of the genus *Corynebacterium* sp. expressing either of *Kosmotoga olearia*-derived fructose-4-epimerase or a variant thereof, the microorganism comprising either of the mutated polynucleotide of the present disclosure or a vector including the mutated polynucleotide.

The mutated polynucleotide, vector, fructose-4-epimerase and a variant of fructose-4-epimerase are as described above.

As used herein, the term "microorganism expressing either of *Kosmotoga olearia*-derived fructose-4-epimerase or a variant thereof" refers to a microorganism naturally having weak ability to produce *Kosmotoga olearia*-derived fructose-4-epimerase or a variant thereof, or a microorganism obtained by imparting the ability to produce *Kosmotoga olearia*-derived fructose-4-epimerase or a variant thereof to a parent strain that does not have the ability to produce the fructose-4-epimerase or a variant thereof. For the purpose of the present disclosure, the microorganism is specifically a microorganism expressing fructose-4-epimerase or a variant thereof, which includes either of a mutated polynucleotide or a vector including the mutated polynucleotide, and the mutated polynucleotide may include mutations of i) a polynucleotide encoding leucine (L) is selected from the group consisting of CTC, CTG, CTT, and TTG; ii) a polynucleotide encoding isoleucine (I) is selected from the group consisting of ATC and ATT; iii) a polynucleotide encoding threonine (T) is selected from the group consisting of ACT, ACG, and ACC; iv) a polynucleotide encoding arginine (R) is selected from the group consisting of CGT, CGC, and CGG; v) a polynucleotide encoding glycine (G) is selected from the group consisting of GGC, GGT, and GGA; vi) a polynucleotide encoding valine (V) is selected from the group consisting of GTA, GTC, GTG, and GTT; vii) a polynucleotide encoding serine(S) is selected from the group consisting of TCA, TCT, TCC, and AGC; viii) a polynucleotide encoding alanine (A) is selected from the group consisting of GCG, GCT, GCC, and GCA; and ix) a polynucleotide encoding glutamine (Q) is selected from the group consisting of CAG and CAA, but is not limited thereto.

The microorganism may be a recombinant microorganism constructed by a method of introducing a vector including the mutated polynucleotide into a host cell. The method for transforming the vector may include any method of introducing a polynucleotide into a cell, and may be carried out by selecting a suitable standard technique as is known in the art. For example, the method may include electroporation, calcium phosphate co-precipitation, retroviral infection, microinjection, DEAE-dextran, a cationic liposome method and a heat shock method, but is not limited thereto.

As used herein, the term "transformation" means introducing a vector including a polynucleotide encoding a target protein into a host cell so that the protein encoded by the polynucleotide may be expressed in the host cell.

The transformed gene may include both a form inserted into a chromosome of a host cell and a form located outside the chromosome as long as it can be expressed in the host cell. The gene includes DNA and RNA as polynucleotides, and any gene may be used without limitation as long as it can be introduced into and expressed in a host cell. For example, the gene may be introduced into a host cell in the form of an expression cassette, which is a polynucleotide construct including all elements necessary for self-expression. The expression cassette may usually include a promoter operably linked to the gene, a transcription termination signal, a ribosome binding site and a translation termination signal.

The expression cassette may be in the form of a recombinant vector capable of self-replication. The gene may be introduced into a host cell in its own form or in the form of a polynucleotide construct and operably linked to a sequence necessary for expression in the host cell.

As used herein, the term "so that a polynucleotide or polypeptide is expressed/a polynucleotide or polypeptide is expressed" refers to a state in which a target polynucleotide or polypeptide is introduced into a microorganism or modified so as to be expressed in the microorganism, and a state in which the activity of the polynucleotide or polypeptide is enhanced compared to the inherent activity or activity before modification when the polynucleotide or polypeptide is a protein present in a microorganism.

Specifically, "introduction of a polypeptide (or protein)" means that activity improved compared to the inherent activity or activity before modification of a target polypeptide is exhibited or that a microorganism exhibits the activity of a specific polypeptide that has not been originally possessed by the microorganism. For example, a polynucleotide encoding a specific polypeptide is introduced into a chromosome in a microorganism, or a vector including a polynucleotide encoding a specific polypeptide is introduced into a microorganism and the activity of the specific polypeptide is exhibited. "Enhancement of activity" means that the activity is improved compared to the inherent activity or activity before modification of a specific polypeptide possessed by a microorganism. The "inherent activity" refers to the activity of a specific polypeptide originally possessed by the parent strain before transformation when the traits of a microorganism are changed by genetic mutations due to natural or artificial factors.

Specifically, the enhancement of activity in the present disclosure may be
1) an increase in intracellular copy number of a gene encoding the protein or an enzyme variant thereof;
2) introduction of a mutation into the expression control sequence of a gene encoding the protein or an enzyme variant thereof;
3) replacement of the expression control sequence of a gene encoding the protein or an enzyme variant thereof with a sequence exhibiting strong activity;
4) replacement of a gene encoding a native protein on a chromosome with the mutated polynucleotide;
5) additional introduction of a mutation into a gene encoding the protein or an enzyme variant thereof to enhance the activity of the protein or an enzyme variant thereof;
6) introduction of a protein or an enzyme variant thereof into a microorganism; or
7) a combination of two or more selected from 1) to 6) above, but is not limited thereto.

In the above, the increase in copy number of a gene is not particularly limited, but may be performed in a form in which the gene is operably linked to a vector or may be performed by inserting the gene into a chromosome in a host cell. Specifically, a vector capable of replicating and functioning independently of a host, to which the mutated polynucleotide of the present disclosure is operably linked, may be introduced into a host cell. Alternatively, a vector capable of inserting the mutated polynucleotide into a chromosome in a host cell, to which the mutated polynucleotide is operably linked, may be introduced into a chromosome of a host cell. Insertion of the mutated polynucleotide into a chromosome may be achieved by any method known in the art, for example, by homologous recombination.

Next, modification of the expression control sequence to increase the expression of the mutated polynucleotide is not particularly limited thereto, but may be performed by inducing a mutation in the sequence by deletion, insertion, or non-conservative or conservative substitution of a nucleic acid sequence or a combination thereof to further enhance the activity of the expression control sequence, or by replacing the expression control sequence with a nucleic acid sequence exhibiting stronger activity. The expression control sequence is not particularly limited thereto, but may include a promoter, an operator sequence, a sequence encoding a ribosome binding site, a sequence for controlling the termination of transcription and translation, and the like.

A strong promoter may be linked to the upper portion of the mutated polynucleotide expression unit instead of the original promoter, but the promoter is not limited thereto. Examples of known strong promoters include cj1 to cj7 promoters (Korean Patent No. 10-0620092), lac promoter, trp promoter, trc promoter, tac promoter, lambda phage PR promoter, PL promoter, tet promoter, gapA promoter, SPL7 promoter, SPL13 (sm3) promoter (Korean Patent No. 10-1783170), O2 promoter (Korean Patent No. 10-1632642), tkt promoter and yccA promoter, but the promoter is not limited thereto.

The modification of the mutated polynucleotide sequence on a chromosome is not particularly limited thereto, but may be performed by inducing a mutation in the expression control sequence by deletion, insertion, or non-conservative or conservative substitution of a nucleic acid sequence or a combination thereof to further enhance the activity of the mutated polynucleotide, or by replacing the mutated polynucleotide sequence with a mutated polynucleotide sequence to further enhance the activity.

Such introduction of a target polypeptide (or protein) and enhancement of the activity may be to increase the expression, activity or concentration of the corresponding polypeptide based on the expression, activity or concentration of the polypeptide in a wild-type or unmodified microbial strain, but is not limited thereto.

As used herein, the term "unmodified microorganism" does not exclude strains including mutations that may occur naturally in the microorganism, but refers to a native strain itself, or a microorganism that does not include the mutated polynucleotide and a gene encoding a target polypeptide, or a microorganism that is not transformed with a vector including the mutated polynucleotide and a gene encoding a target polypeptide.

For the purposes of the present disclosure, the target polypeptide may be a fructose-4-epimerase or a variant thereof, but is not limited thereto.

The recombinant microorganism may include both prokaryotic microorganisms and eukaryotic microorganisms as long as they are microorganisms that include the mutated polynucleotide of the present disclosure or a vector including the mutated polynucleotide and can thus produce fructose-4-epimerase or a variant thereof. The recombinant microorganism may include microbial strains belonging to, for example, the genus *Escherichia*, the genus *Erwinia*, the genus *Serratia*, the genus *Providencia*, the genus *Corynebacterium*, and the genus *Brevibacterium*, and may specifically be the genus *Corynebacterium*. For example, the genus *Corynebacterium* may be *Corynebacterium glutamicum, Corynebacterium ammoniagenes, Corynebacterium crudilactis, Corynebacterium deserti, Corynebacterium efficiens, Corynebacterium callunae, Corynebacterium stationis, Corynebacterium singulare, Corynebacterium halotolerans, Corynebacterium striatum, Corynebacterium pollutisoli,*

*Corynebacterium imitans, Corynebacterium testudinoris*, or *Corynebacterium flavescens*, more specifically *Corynebacterium glutamicum*, but the recombinant microorganism is not limited thereto.

For the purposes of the present disclosure, the recombinant microorganism may be a microorganism that produces a larger amount of fructose-4-epimerase or a variant thereof than a wild-type or unmodified microbial strain.

The microorganism of the present disclosure may include all microorganisms capable of expressing the fructose-4-epimerase or a variant thereof of the present disclosure by various known methods in addition to the introduction of a nucleic acid or vector.

Another aspect of the present disclosure is to provide a method for producing a fructose-4-epimerase or a variant thereof, the method comprising culturing a microorganism of the genus *Corynebacterium* sp. including either of the mutated polynucleotide according to the present disclosure or a vector including the mutated polynucleotide in a medium.

The mutated polynucleotide, vector, fructose-4-epimerase, variant of fructose-4-epimerase, and microorganism are as described above.

For the purpose of the present invention, the microorganism of the genus *Corynebacterium* sp. may be one that expresses either of *Kosmotoga olearia*-derived fructose-4-epimerase or a variant thereof, but is not limited thereto.

As used herein, the term "culture" means growing the microorganism in an appropriately controlled environmental condition. The culture process of the present disclosure may be performed according to proper medium and culture conditions known in the art. Such a culture process may be easily adjusted and used by those skilled in the art depending on the selected strain. Specifically, the culture may be batch culture, continuous culture, and fed-batch culture, but is not limited thereto.

As used herein, the term "medium" refers to a material in which nutrients necessary for culturing the microorganism are mixed as main components, and supplies nutrients and growth factors including water, which are essential for survival and development. Specifically, as the medium and other culture conditions used for culturing the microorganism of the present disclosure, any medium may be used without any particular limitation as long as it is a medium conventionally used for culturing microorganisms. The microorganism of the present disclosure may be cultured in a conventional medium containing appropriate carbon sources, nitrogen sources, phosphorus sources, inorganic compounds, amino acids and/or vitamins, and the like under an aerobic condition while controlling the temperature, pH and the like.

In the present disclosure, the carbon sources may include carbohydrates such as glucose, fructose, sucrose, and maltose; sugar alcohols such as mannitol and sorbitol; organic acids such as pyruvic acid, lactic acid, and citric acid; and amino acids such as glutamic acid, methionine, and lysine. Natural organic nutrients such as starch hydrolysates, molasses, blackstrap molasses, rice bran, cassava, sugarcane waste and corn steep liquor may be used. Specifically, carbohydrates such as glucose and sterilized pre-treated molasses (namely, molasses converted into reducing sugar) may be used. Appropriate amounts of other carbon sources may be variously used without limitation. These carbon sources may be used singly or in combination of two or more kinds thereof, but the carbon sources are not limited thereto.

As the nitrogen sources, inorganic nitrogen sources such as ammonia, ammonium sulfate, ammonium chloride, ammonium acetate, ammonium phosphate, ammonium carbonate, and ammonium nitrate; and organic nitrogen sources such as amino acids such as glutamic acid, methionine, and glutamine, peptone, NZ-amine, meat extract, yeast extract, malt extract, corn steep liquor, casein hydrolysates, fish or decomposition products thereof, and defatted soybean cake or decomposition products thereof may be used. These nitrogen sources may be used singly or in combination of two or more kinds thereof, but the nitrogen sources are not limited thereto.

The phosphorus sources may include potassium phosphate monobasic, potassium phosphate dibasic, or a sodium-containing salt corresponding thereto. As the inorganic compounds, sodium chloride, calcium chloride, iron chloride, magnesium sulfate, iron sulfate, manganese sulfate, calcium carbonate and the like may be used, and the inorganic compounds may include amino acids, vitamins and/or suitable precursors in addition to these. These components or precursors may be added to the medium either batchwise or continuously. However, the medium is not limited thereto.

In the present disclosure, during the culture of microorganism, compounds such as ammonium hydroxide, potassium hydroxide, ammonia, phosphoric acid, and sulfuric acid may be added to the medium in an appropriate manner to adjust the pH of the medium. During the culture, an antifoaming agent such as fatty acid polyglycol ester may be used to suppress bubble formation. Oxygen or oxygen-containing gas may be injected into the medium in order to maintain the aerobic state of the medium, or nitrogen, hydrogen or carbon dioxide gas may be injected or gas may not be injected in order to maintain the anaerobic and microaerobic states, but the conditions are not limited thereto.

The temperature of the medium may be 20° C. to 50° C., specifically 30° C. to 37° C., but is not limited thereto. The culture may be continuously performed until the desired amount of useful substance produced is obtained, and the culture period may specifically be 10 hours to 100 hours, but is not limited thereto.

The fructose-4-epimerase or variant of fructose-4-epimerase produced by the culture may be discharged into the medium or may not be discharged into the medium but may remain in the cell.

The production method may comprise a step of recovering fructose-4-epimerase or a variant thereof from the cultured medium or microorganism.

The method for recovering the fructose-4-epimerase or a variant thereof produced in the culture step of the present disclosure may be to collect the desired enzyme from the culture solution using a suitable method known in the art depending on the culture method. For example, centrifugation, filtration, anion exchange chromatography, crystallization and HPLC may be used, and the desired enzyme may be recovered from the medium or microorganism using any suitable method known in the art.

The recovery step may include a purification process, and the purification process may be performed using a suitable method known in the art. Hence, the recovered enzyme may be in a purified form or an enzyme-containing broth that is fermented by a microorganism (*Introduction to Biotechnology and Genetic Engineering*, A. J. Nair, 2008).

Another aspect of the present disclosure is to provide a composition for tagatose production, comprising a microorganism of the genus *Corynebacterium* sp. including either of the mutated polynucleotide of the present disclosure or a vector including the mutated polynucleotide; or a culture of the microorganism.

Another aspect of the present disclosure is to provide the use for tagatose production of a microorganism of the genus *Corynebacterium* sp. Including either of the mutated polynucleotide of the present disclosure or a vector including the mutated polynucleotide.

The mutated polynucleotide, vector, fructose-4-epimerase, variant of fructose-4-epimerase, and microorganism are as described above.

For the purposes of the present invention, the microorganism of the genus *Corynebacterium* sp. may be one that expresses either of *Kosmotoga olearia*-derived fructose-4-epimerase or a variant thereof, but is not limited thereto.

The composition for tagatose production may further contain fructose, but is not limited thereto.

The composition for tagatose production of the present disclosure may further contain arbitrary suitable excipients commonly used in the composition for tagatose production. Such excipients may be, for example, preservatives, wetting agents, dispersing agents, suspending agents, buffers, stabilizing agents, or isotonic agents, but are not limited thereto.

The composition for tagatose production of the present disclosure may further contain a metal ion or a metal salt. In an embodiment, the metal of the metal ion or metal salt may be a metal including a divalent cation. Specifically, the metal of the present disclosure may be nickel (Ni), iron (Fe), cobalt (Co), magnesium (Mg), or manganese (Mn). More specifically, the metal salt may be $MgSO_4$, $FeSO_4$, $NiSO_4$, $NiCl_2$, $MgCl_2$, $CoSO_4$, $MnCl_2$, or $MnSO_4$.

Another aspect of the present disclosure is to provide a method for preparing tagatose, the method comprising bringing a microorganism of the genus *Corynebacterium* sp. including either of the mutated polynucleotide of the present disclosure or a vector including the mutated polynucleotide; or a culture of the microorganism into contact with fructose.

The mutated polynucleotide, vector, fructose-4-epimerase, variant of fructose-4-epimerase, and microorganism are as described above.

For the purposes of the present invention, the microorganism of the genus *Corynebacterium* sp. may be one that expresses either of *Kosmotoga olearia*-derived fructose-4-epimerase or a variant thereof, but is not limited thereto.

The step of bringing a microorganism of the genus *Corynebacterium* sp. or a culture of the microorganism into contact with fructose may be a step of bringing a microorganism of the genus *Corynebacterium* sp. or a culture of the microorganism into contact with fructose to convert the fructose into tagatose, but is not limited thereto.

The variant of fructose-4-epimerase may be used as a fructose-4-epimerase to prepare tagatose from fructose, but is not limited thereto.

As an example, the contact of the present disclosure may be performed under a pH 5.0 to pH 9.0 condition and a 30° C. to 80° C. temperature condition and/or for 0.5 hour to 48 hours. Specifically, the contact of the present disclosure may be performed under a pH 6.0 to pH 9.0 condition or pH 7.0 to pH 9.0 condition. The contact of the present disclosure may be performed under a 35° C. to 80° C., 40° C. to 80° C., 45° C. to 80° C., 50° C. to 80° C., 55° C. to 80° C., 60° C. to 80° C., 30° C. to 70° C., 35° C. to 70° C., 40° C. to 70° C., 45° C. to 70° C., 50° C. to 70° C., 55° C. to 70° C., 60° C. to 70° C., 30° C. to 65° C., 35° C. to 65° C., 40° C. to 65° C., 45° C. to 65° C., 50° C. to 65° C., 55° C. to 65° C., 30° C. to 60° C., 35° C. to 60° C., 40° C. to 60° C., 45° C. to 60° C., 50° C. to 60° C., or 55° C. to 60° C. temperature condition. The contact of the present disclosure may be performed for 0.5 hours to 36 hours, for 0.5 hours to 24 hours, for 0.5 hours to 12 hours, for 0.5 hours to 6 hours, for 1 hour to 48 hours, for 1 hour to 36 hours, for 1 hour to 24 hours, for 1 hour to 12 hours, for 1 hour to 6 hours, for 3 hours to 48 hours, for 3 hours to 36 hours, for 3 hours to 24 hours, for 3 hours to 12 hours, for 3 hours to 6 hours, for 6 hours to 48 hours, for 6 hours to 36 hours, for 6 hours to 24 hours, for 6 hours to 12 hours, for 12 hours to 48 hours, for 12 hours to 36 hours, for 12 hours to 24 hours, for 18 hours to 48 hours, for 18 hours to 36 hours, or for 18 hours to 30 hours.

The contact of the present disclosure may be performed in the presence of a metal ion or a metal salt. The metal ion or metal salt that can be used is the same as those in the above-described aspect.

The preparation method of the present disclosure may further comprise a step of separating and/or purifying the prepared tagatose. The separation and/or purification may be performed by a method commonly used in the technical field of the present disclosure. As non-limiting examples, dialysis, precipitation, adsorption, electrophoresis, ion exchange chromatography, and fractional crystallization may be used. The purification may be performed by only one method or by two or more methods.

The preparation method of the present disclosure may further comprise a step of performing decolorization and/or desalting before or after the separation and/or purification step. By performing the decolorization and/or desalting, tagatose that is significantly excellent in quality may be obtained.

As another example, the preparation method of the present disclosure may further comprise a step of crystallizing tagatose after the step of converting fructose into tagatose, the separation and/or purification step, or the decolorization and/or desalting step of the present disclosure. The crystallization may be performed by a crystallization method commonly used. For example, crystallization may be performed by a cooling crystallization method.

The preparation method of the present disclosure may further comprise a step of concentrating tagatose before the crystallization step. The concentration may increase the crystallization efficiency.

As another example, the preparation method of the present disclosure may further comprise a step of bringing unreacted fructose into contact with the enzyme of the present disclosure, a microorganism expressing the enzyme, or a culture of the microorganism after the separation and/or purification step of the present disclosure; a step of reusing the mother liquor from which crystals are separated in the separation and/or purification step after the crystallization step of the present disclosure; or a combination thereof.

DETAILED DESCRIPTION OF THE INVENTION

Hereinafter, the present disclosure will be described in more detail with reference to Examples and Experimental Examples. However, these Examples and Experimental Examples are for illustrative purposes of the present disclosure, and the scope of the present disclosure is not limited to these Examples and Experimental Examples.

Example 1: Verification of Expression Level of *Kosmotoga olearia*-Derived Fructose-4-Epimerase Expressed from Mutated Polynucleotide In order to increase the gene expression efficiency of *Kosmotoga olearia*-derived fructose-4-epimerase known from Korean Patent Publication No. 10-2018-0111678 A in a *Corynebacterium* strain (*C. glutamicum*), fructose-4-epimerase gene (SEQ ID NO: 3), which was a mutated polynucleotide, was constructed. The sequence of 6×His-tag was added for isolation during the construction of fructose-4-epimerase gene.

As the plasmid, a pHCP plasmid in which position 21 in orfA2 (parB) was mutated to adenine (A) (Korean Patent Publication No. 10-2018-0092110 A) was used for a high copy number. In the present disclosure, it was attempted to obtain a plasmid with a higher copy number than the existing pHCP. For this, the sequence of 98 bp, which was the ctRNA portion of pHCP, was randomly altered and screened. As a result, a polynucleotide in which the 22nd nucleotide at the ctRNA portion was substituted with C (cytosine) and a polynucleotide in which the 79th nucleotide was substituted with C (cytosine) were finally identified. The high-copy-number plasmid including this was named pHCP7 vector (SEQ ID NO: 8), and a plasmid including the fructose-4-epimerase gene sequence was constructed using the vector.

Each of the mutated fructose-4-epimerase genes was inserted into the pHCP7 vector and this was transformed into a *Corynebacterium* strain (*C. glutamicum* ATCC13032). The transformed *Corynebacterium* strain was cultured in 10 mL of BHI medium containing 25 μg/mL kanamycin (Km) at 30° C. for 24 hours under stirring at 200 rpm. Thereafter, the cultured medium was placed in 50 mL of fresh BHI medium containing 25 μg/mL Km at 1/100 volume ratio and cultured at 30° C. for 24 hours under stirring at 200 rpm.

The cultured strain was recovered at O.D 600 nm of 4, suspended in 300 μL PBS, and sonicated (for 7 minutes in total at 50% pulse and 20% amplitude) in an ice bucket. The supernatant obtained by centrifuging the disrupted strain was mixed with 5× sample buffer and heated at 100° C. for 5 minutes. After the mixture was loaded on 12% SDS-PAGE, a staining solution using coomassie brilliant blue and a destaining solution were used to identify proteins. To analyze the protein expression level, the expression level of fructose-4-epimerase among the total proteins was confirmed using a gel analyzer program.

As a result, as illustrated in FIG. 1, it was confirmed that the expression level of fructose-4-epimerase expressed from the mutated polynucleotide was increased by about 6% or more compared to that of the fructose-4-epimerase wild-type (before mutation) polynucleotide (WT).

Example 2: Verification of Tagatose Conversion Rate by Fructose-4-Epimerase Expressed from Mutated Polynucleotide At 3,500 rpm and 4° C. for 10 minutes, 45 ml of the *Corynebacterium* strain culture solution cultured in Example 1 was centrifuged and then washed with 10 mL Tris-HCl (pH 8.0) buffer. Thereafter, centrifugation was performed under the same conditions as above and the weight was measured. An amount corresponding to 20% weight of the final reaction volume of the recovered strain was seeded in a 2 mL tube, and heat pretreatment was performed at 60° C. for 30 minutes. $CoSO_4$ or $NiSO_4$ to be added for the tagatose conversion reaction was also subjected to the heat pretreatment. The strain and 50 mM tris-HCl (pH 8.0) containing a substrate (30% fructose) and 3 mM $CoSO_4$ or $NiSO_4$ were mixed together and reacted at 60° C. for 2 hours. After the reaction was completed, the sample was centrifuged at 13,000 rpm and 4° C. for 10 minutes to recover the supernatant and the supernatant was analyzed by HPLC. For HPLC, the Aminex HPX-87H column using 5 mM $H_2SO_4$ solvent was used, and the amount of tagatose produced was analyzed.

As a result, as illustrated in FIG. 2, it was confirmed that the tagatose conversion rate by fructose-4-epimerase expressed from the mutated polynucleotide was about 22%, which was superior to that by WT (#7_KO(KNF4E)) as much as 7%.

Example 3: Verification of Expression Level of Fructose-4-Epimerase Variant Expressed from Mutated Polynucleotide An experiment was conducted to confirm whether the expression level was increased even when some amino acid sequences were mutated in the *Kosmotoga olearia*-derived fructose-4-epimerase of Example 1. The gene sequences of two enzyme variants (N97Y, T124W, N367V mutation: SEQ ID NO: 4, T124W mutation: SEQ ID NO: 6) obtained by mutating amino acids in the fructose-4-epimerase gene (SEQ ID NO: 3), which was a mutated polynucleotide, were constructed, respectively. The strain containing the enzyme variant (SEQ ID NO: 4) was named *Corynebacterium glutamicum* CF01-0014, and was deposited with the Korean Culture Center of Microorganisms, a trustee institution under the Budapest Treaty, on Oct. 18, 2019, and given an accession number KCCM12610P.

Each of the mutated fructose-4-epimerase genes was inserted into the pHCP7 vector, this was introduced into a *Corynebacterium* strain, and the expression levels of the two enzyme variants in the strain were confirmed through Western blot by the method of Example 1.

As a result, as illustrated in FIG. 3, it was confirmed that the expression level of N97Y, T124W, N367V variant (lane 4) of fructose-4-epimerase expressed from the mutated polynucleotide was increased by about 8% compared to that of WT (lane 2) and the expression level of T124W variant (lane 5) was increased by about 12% or more compared to that of the fructose-4-epimerase wild-type (before mutation) polynucleotide (WT), and it was confirmed that the expression levels were similar to that of fructose-4-epimerase (lane 3) expressed from the mutated polynucleotide.

Example 4: Verification of Tagatose Conversion Rate by Fructose-4-Epimerase Variant Expressed from Mutated Polynucleotide The tagatose conversion rates by the two enzyme variants of Example 3 were confirmed by the method of Example 2.

As a result, as illustrated in FIG. 4, it was confirmed that the tagatose conversion rate by the N97Y, T124W, N367V variant (3aa mutation) was about 32%, which was increased by 19% compared to that by WT. The tagatose conversion rate by the T124W variant was also as excellent as 27.8%.

Comparative Example 1: Verification of Expression Level and Tagatose Conversion Rate of *Thermotoga* Neapolitana-Derived Fructose-4-Epimerase to which the Same Nucleotide Mutation was Applied Constructed were mutated polynucleotide variant 2 and variant 1 (SEQ ID NOS: 12 and 13) in which nucleotide mutations the same as those in Example 1 were applied to the nucleic acid sequence (SEQ ID NO: 9) encoding a variant (SEQ ID NO: 10) of *Thermotoga* neapolitana-derived fructose-4-epimerase (Hexuronic acid C4-epimerase, SEQ ID NO: 9) known from Korean Patent Publication No.

10-2017-0015250 A, these were inserted into the pHCP vector, these were introduced into a *Corynebacterium* strain, and then the expression levels and tagatose conversion rates were confirmed by the methods of Examples 1 and 2.

As a result, as illustrated in FIG. 5, the expression levels of the fructose-4-epimerase variants (variant 1/TN_variant_1, variant 2/TN_variant_2, CJ) expressed from the mutated polynucleotide were lower compared to that of WT and the tagatose conversion rates by the fructose-4-epimerase variants were also lower compared to that by WT (FIG. 6).

In particular, the fructose-4-epimerase variants exhibited higher activity than the wild-type (before mutation) fructose-4-epimerase in Korean Patent Publication No. 10-2017-0015250 A, but it was confirmed that the activity when the polynucleotide of the enzyme variants was mutated was lower compared to that of the wild-type (before mutation) fructose-4-epimerase, and thus the expression levels were significantly decreased.

Accordingly, it has been confirmed that the nucleotide mutation according to the present disclosure is effective for an enzyme derived from *Kosmotoga olearia*.

Based on the above description, it will be understood by those skilled in the art that the present disclosure may be implemented in a different specific form without changing the technical spirit or essential characteristics thereof. Therefore, it should be understood that the above embodiment is not limitative, but illustrative in all aspects. The scope of the present disclosure is defined by the appended claims rather than by the description preceding them, and therefore all changes and modifications that fall within metes and bounds of the claims or equivalents of such metes and bounds are intended to be embraced by the claims.

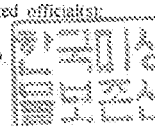

The invention claimed is:

1. A mutated polynucleotide encoding a fructose-4-epimerase or a variant of the fructose-4-epimerase, wherein the mutated polynucleotide has any one or more nucleic acid sequences selected from the group consisting of SEQ ID NO: 3, SEQ ID NO: 4, and SEQ ID NO: 6.

2. A vector comprising the mutated polynucleotide according to claim 1.

3. A microorganism of the genus *Corynebacterium* sp. expressing either of *Kosmotoga olearia*-derived fructose-4-epimerase or a variant of the fructose-4-epimerase, the microorganism comprising either of the mutated polynucleotide according to claim 1 or a vector including the mutated polynucleotide.

4. A method for producing fructose-4-epimerase or a variant of the fructose-4-epimerase, the method comprising culturing a microorganism of the genus *Corynebacterium* sp. including either of the mutated polynucleotide according to claim 1 or a vector including the mutated polynucleotide in a medium.

5. A composition for tagatose production, comprising a microorganism of the genus *Corynebacterium* sp. including either of the mutated polynucleotide according to claim 1 or a vector including the mutated polynucleotide; or a culture of the microorganism.

6. The composition for tagatose production according to claim 5, wherein the composition further comprises fructose.

7. A method for preparing tagatose, the method comprising bringing a microorganism of the genus *Corynebacterium* sp. including either of the mutated polynucleotide according to claim 1 or a vector including the mutated polynucleotide; or a culture of the microorganism into contact with fructose.

* * * * *

SEQUENCE LISTING

<160> NUMBER OF SEQ ID NOS: 13

<210> SEQ ID NO 1
<211> LENGTH: 1308
<212> TYPE: DNA
<213> ORGANISM: Unknown
<220> FEATURE:
<223> OTHER INFORMATION: Kosmotoga olearia fructose-4-epimerase Wild type_ polynucleotide

<400> SEQUENCE: 1

```
atgaaaaaac atcctcttca ggacattgtt tcattgcaaa acagggaat acccaaaggg      60
gttttctctg tatgtagtgc aatagattt gttattgaaa ccactctgga atatgcgaag     120
atgaaaggga caacggttct tatagaggcc acctgcaatc aggtaaacca gttcggtggc     180
tacaccggta tgactcctgc tgatttcaga gaaatggttt tttctatcgc tgaggatatt     240
ggacttccca aaataaaat catccttggt ggcgaccatc ttggcccaaa tccctggaag     300
ggtcagccgt cagatcaggc tatgcgtaac gccattgaaa tgattcgaga atacgctaaa     360
gctgggttta ccaagcttca tctggatgcc agcatgcgtc ttgcagacga tccggggaac     420
gaaaacgagc cgctgaaccc ggaagttata gcggaaagaa cagctcttct ctgtcttgaa     480
gccgagaggg cttttaaaga atccgccggt tctctccggc ctgtttacgt tattggtacg     540
gatgttccgc caccgggtgg agcgcaaaac gaaggtaaat cgattcatgt aaccagtgtt     600
caggattttg agcgtaccgt tgagttgacc aaaaaggcat ttttcgacca tggtttgtat     660
gaagcctggg gaagggtgat tgcggttgtt gtgcaaccgg gagtagaatt cgggaatgaa     720
catatattcg aatatgatag aaatcgagcg agagaactta ctgaggcgat aaaaaagcat     780
ccaaatatag ttttttgaagg tcactcgaca gattatcaaa cggcaaaagc attgaaagaa     840
atggtagaag acggtgtagc catactcaag gttgggccag ctctaacatt tgcgctcaga     900
gaggcttttt ttgcgttgag cagcattgaa aaagagttat tttatgatac acccgggctt     960
tgttcaaact tgttgaagt tgtcgagaga gcgatgcttg acaatccaaa acattgggaa    1020
aaatattacc aggagaaga gagagaaaat agattagccc gtaaatacag ctttctcgat    1080
cgcttgaggt attactggaa tcttcctgag gttagaacag cggtgaataa gctgataacc    1140
aaccttgaaa caaagaaat cccgttaacg cttataagcc agttcatgcc gatgcagtac    1200
caaaaaatca gaaacggttt gctaagaaag gatccaataa gccttataaa agatcgaatt    1260
acccttgttc ttgatgacta ctatttcgca actcaccctg aatgttga               1308
```

<210> SEQ ID NO 2
<211> LENGTH: 435
<212> TYPE: PRT
<213> ORGANISM: Unknown
<220> FEATURE:
<223> OTHER INFORMATION: Kosmotoga olearia fructose-4-epimerase_amino acid

<400> SEQUENCE: 2

```
Met Lys Lys His Pro Leu Gln Asp Ile Val Ser Leu Gln Lys Gln Gly
  1               5                  10                  15

Ile Pro Lys Gly Val Phe Ser Val Cys Ser Ala Asn Arg Phe Val Ile
             20                  25                  30

Glu Thr Thr Leu Glu Tyr Ala Lys Met Lys Gly Thr Thr Val Leu Ile
         35                  40                  45

Glu Ala Thr Cys Asn Gln Val Asn Gln Phe Gly Gly Tyr Thr Gly Met
     50                  55                  60
```

Thr Pro Ala Asp Phe Arg Glu Met Val Phe Ser Ile Ala Glu Asp Ile
65                  70                  75                  80

Gly Leu Pro Lys Asn Lys Ile Ile Leu Gly Gly Asp His Leu Gly Pro
                85                  90                  95

Asn Pro Trp Lys Gly Gln Pro Ser Asp Gln Ala Met Arg Asn Ala Ile
            100                 105                 110

Glu Met Ile Arg Glu Tyr Ala Lys Ala Gly Phe Thr Lys Leu His Leu
            115                 120                 125

Asp Ala Ser Met Arg Leu Ala Asp Pro Gly Asn Glu Asn Glu Pro
130                 135                 140

Leu Asn Pro Glu Val Ile Ala Glu Arg Thr Ala Leu Leu Cys Leu Glu
145                 150                 155                 160

Ala Glu Arg Ala Phe Lys Glu Ser Ala Gly Ser Leu Arg Pro Val Tyr
                165                 170                 175

Val Ile Gly Thr Asp Val Pro Pro Gly Gly Ala Gln Asn Glu Gly
                180                 185                 190

Lys Ser Ile His Val Thr Ser Val Gln Asp Phe Glu Arg Thr Val Glu
                195                 200                 205

Leu Thr Lys Lys Ala Phe Phe Asp His Gly Leu Tyr Glu Ala Trp Gly
210                 215                 220

Arg Val Ile Ala Val Val Gln Pro Gly Val Glu Phe Gly Asn Glu
225                 230                 235                 240

His Ile Phe Glu Tyr Asp Arg Asn Arg Ala Arg Glu Leu Thr Glu Ala
                245                 250                 255

Ile Lys Lys His Pro Asn Ile Val Phe Glu Gly His Ser Thr Asp Tyr
                260                 265                 270

Gln Thr Ala Lys Ala Leu Lys Glu Met Val Glu Asp Gly Val Ala Ile
                275                 280                 285

Leu Lys Val Gly Pro Ala Leu Thr Phe Ala Leu Arg Glu Ala Phe Phe
290                 295                 300

Ala Leu Ser Ser Ile Glu Lys Glu Leu Phe Tyr Asp Thr Pro Gly Leu
305                 310                 315                 320

Cys Ser Asn Phe Val Glu Val Val Glu Arg Ala Met Leu Asp Asn Pro
                325                 330                 335

Lys His Trp Glu Lys Tyr Tyr Gln Gly Glu Glu Arg Glu Asn Arg Leu
                340                 345                 350

Ala Arg Lys Tyr Ser Phe Leu Asp Arg Leu Arg Tyr Tyr Trp Asn Leu
                355                 360                 365

Pro Glu Val Arg Thr Ala Val Asn Lys Leu Ile Thr Asn Leu Glu Thr
                370                 375                 380

Lys Glu Ile Pro Leu Thr Leu Ile Ser Gln Phe Met Pro Met Gln Tyr
385                 390                 395                 400

Gln Lys Ile Arg Asn Gly Leu Leu Arg Lys Asp Pro Ile Ser Leu Ile
                405                 410                 415

Lys Asp Arg Ile Thr Leu Val Leu Asp Asp Tyr Tyr Phe Ala Thr His
                420                 425                 430

Pro Glu Cys
        435

<210> SEQ ID NO 3
<211> LENGTH: 1305
<212> TYPE: DNA
<213> ORGANISM: Artificial Sequence
<220> FEATURE:

<223> OTHER INFORMATION: Kosmotoga olearia fructose-4-epimerase Variant
      polynucleotide_ polynucleotide

<400> SEQUENCE: 3

```
atgaaaaagc atccattgca ggacatcgta tcactgcaga agcagggtat ccccaagggc    60
gtcttctcag tctgttccgc taaccgtttc gtcatcgaga ccactctgga atacgccaag   120
atgaagggca ctacggttct tattgaagca acctgtaacc aggtgaacca gtttggcggc   180
tacaccggta tgactcctgc cgacttccgc gagatggtct tctccattgc tgaagacatt   240
ggccttccta agaacaaaat cattctcggc ggcgaccacc tcggtcccaa tccgtggaag   300
ggtcagcctt ccgaccaggc tatgcggaac gctattgaaa tgattcgcga gtacgccaaa   360
gcaggcttta ccaaactcca cttggacgct tcaatgcggc tggctgacga tcctggaaac   420
gagaacgagc ccttgaaccc agaagtcatt gcagagcgga ctgctctctt gtgcctggaa   480
gccgaacgtg cctttaaaga atccgcaggt tctctccgcc ctgtttacgt cattggcacg   540
gacgttccgc caccaggagg tgctcagaat gagggaaaga gcattcacgt tacctccgtg   600
caggacttcg aacgtaccgt tgagcttacc aagaaagcat tctttgacca tggtctctat   660
gaggcctggg gccgtgtgat cgccgttgtt gtgcagcccg cgttgaatt cggtaacgag   720
cacatttttg aatatgatcg gaaccgtgca cgcgaattga ccgaagctat caaaaaacac   780
cctaacattg ttttcgaagg ccatagcacg gactaccaga cggccaaagc attgaaggaa   840
atggttgaag acggagtagc aattttgaag gtaggccccg cactgaccct tgcgcttcgg   900
gaagcatttt ttgcgctttc ttccatcgag aaggaacttt tctacgatac ccctggactt   960
tgtagcaact tcgttgaagt tgtagagcgg gctatgctgg acaaccctaa gcactgggaa  1020
aagtactacc agggagagga acgggagaat cggcttgcac gcaaatacag ctttcttgac  1080
cgcctccgtt actattggaa tctgcccgag gtacgtactg ccgtgaataa gttgatcacc  1140
aatttggaaa cgaaagaaat cccattgacg ctcattagcc agttcatgcc gatgcagtat  1200
caaaagattc gcaatggtct gctgcggaaa gatcccatct ctctgatcaa ggaccggatc  1260
accttggtcc tggacgatta ctattttgca acccatcctg aatgt              1305
```

<210> SEQ ID NO 4
<211> LENGTH: 1305
<212> TYPE: DNA
<213> ORGANISM: Artificial Sequence
<220> FEATURE:
<223> OTHER INFORMATION: Kosmotoga olearia fructose-4-epimerase Variant
      polynucleotide_WVY_ polynucleotide

<400> SEQUENCE: 4

```
atgaaaaagc atccattgca ggacatcgta tcactgcaga agcagggtat ccccaagggc    60
gtcttctcag tctgttccgc taaccgtttc gtcatcgaga ccactctgga atacgccaag   120
atgaagggca ctacggttct tattgaagca acctgtaacc aggtgaacca gtttggcggc   180
tacaccggta tgactcctgc cgacttccgc gagatggtct tctccattgc tgaagacatt   240
ggccttccta agaacaaaat cattctcggc ggcgaccacc tcggtcccta cccgtggaag   300
ggtcagcctt ccgaccaggc tatgcggaac gctattgaaa tgattcgcga gtacgccaaa   360
gcaggctttt ggaaactcca cttggacgct tcaatgcggc tggctgacga tcctggaaac   420
gagaacgagc ccttgaaccc agaagtcatt gcagagcgga ctgctctctt gtgcctggaa   480
gccgaacgtg cctttaaaga atccgcaggt tctctccgcc ctgtttacgt cattggcacg   540
gacgttccgc caccaggagg tgctcagaat gagggaaaga gcattcacgt tacctccgtg   600
```

-continued

```
caggacttcg aacgtaccgt tgagcttacc aagaaagcat tctttgacca tggtctctat    660
gaggcctggg gccgtgtgat cgccgttgtt gtgcagcccg gcgttgaatt cggtaacgag    720 cacattttg aatatgatcg aaccgtgca cgcgaattga ccgaagctat caaaaaacac      780
cctaacattg ttttcgaagg ccatagcacg gactaccaga cggccaaagc attgaaggaa    840
atggttgaag acggagtagc aattttgaag gtaggccccg cactgacctt tgcgcttcgg    900
gaagcatttt ttgcgctttc ttccatcgag aaggaacttt tctacgatac ccctggactt    960
tgtagcaact tcgttgaagt tgtagagcgg gctatgctgg acaaccctaa gcactgggaa   1020
aagtactacc aggagagga acgggagaat cggcttgcac gcaaatacag ctttcttgac    1080
cgcctccgtt actattgggt tctgcccgag gtacgtactg ccgtgaataa gttgatcacc   1140
aatttggaaa cgaaagaaat cccattgacg ctcattagcc agttcatgcc gatgcagtat   1200
caaaagattc gcaatggtct gctgcggaaa gatcccatct ctctgatcaa ggaccggatc   1260
accttggtcc tggacgatta ctattttgca acccatcctg aatgt                   1305
```

<210> SEQ ID NO 5
<211> LENGTH: 435
<212> TYPE: PRT
<213> ORGANISM: Artificial Sequence
<220> FEATURE:
<223> OTHER INFORMATION: Kosmotoga olearia fructose-4-epimerase
      Variant_WVY_amino acid

<400> SEQUENCE: 5

```
Met Lys Lys His Pro Leu Gln Asp Ile Val Ser Leu Gln Lys Gln Gly
1               5                   10                  15

Ile Pro Lys Gly Val Phe Ser Val Cys Ser Ala Asn Arg Phe Val Ile
            20                  25                  30

Glu Thr Thr Leu Glu Tyr Ala Lys Met Lys Gly Thr Thr Val Leu Ile
        35                  40                  45

Glu Ala Thr Cys Asn Gln Val Asn Gln Phe Gly Gly Tyr Thr Gly Met
    50                  55                  60

Thr Pro Ala Asp Phe Arg Glu Met Val Phe Ser Ile Ala Glu Asp Ile
65                  70                  75                  80

Gly Leu Pro Lys Asn Lys Ile Ile Leu Gly Gly Asp His Leu Gly Pro
                85                  90                  95

Tyr Pro Trp Lys Gly Gln Pro Ser Asp Gln Ala Met Arg Asn Ala Ile
            100                 105                 110

Glu Met Ile Arg Glu Tyr Ala Lys Ala Gly Phe Trp Lys Leu His Leu
        115                 120                 125

Asp Ala Ser Met Arg Leu Ala Asp Asp Pro Gly Asn Glu Asn Glu Pro
    130                 135                 140

Leu Asn Pro Glu Val Ile Ala Glu Arg Thr Ala Leu Leu Cys Leu Glu
145                 150                 155                 160

Ala Glu Arg Ala Phe Lys Glu Ser Ala Gly Ser Leu Arg Pro Val Tyr
                165                 170                 175

Val Ile Gly Thr Asp Val Pro Pro Gly Gly Ala Gln Asn Glu Gly
            180                 185                 190

Lys Ser Ile His Val Thr Ser Val Gln Asp Phe Glu Arg Thr Val Glu
        195                 200                 205

Leu Thr Lys Lys Ala Phe Phe Asp His Gly Leu Tyr Glu Ala Trp Gly
    210                 215                 220

Arg Val Ile Ala Val Val Val Gln Pro Gly Val Glu Phe Gly Asn Glu
```

His Ile Phe Glu Tyr Asp Arg Asn Arg Ala Arg Glu Leu Thr Glu Ala
                245                 250                 255
Ile Lys Lys His Pro Asn Ile Val Phe Glu Gly His Ser Thr Asp Tyr
            260                 265                 270
Gln Thr Ala Lys Ala Leu Lys Glu Met Val Glu Asp Gly Val Ala Ile
        275                 280                 285
Leu Lys Val Gly Pro Ala Leu Thr Phe Ala Leu Arg Glu Ala Phe Phe
    290                 295                 300
Ala Leu Ser Ser Ile Glu Lys Glu Leu Phe Tyr Asp Thr Pro Gly Leu
305                 310                 315                 320
Cys Ser Asn Phe Val Glu Val Glu Arg Ala Met Leu Asp Asn Pro
                325                 330                 335
Lys His Trp Glu Lys Tyr Tyr Gln Gly Glu Glu Arg Glu Asn Arg Leu
            340                 345                 350
Ala Arg Lys Tyr Ser Phe Leu Asp Arg Leu Arg Tyr Tyr Trp Val Leu
        355                 360                 365
Pro Glu Val Arg Thr Ala Val Asn Lys Leu Ile Thr Asn Leu Glu Thr
    370                 375                 380
Lys Glu Ile Pro Leu Thr Leu Ile Ser Gln Phe Met Pro Met Gln Tyr
385                 390                 395                 400
Gln Lys Ile Arg Asn Gly Leu Leu Arg Lys Asp Pro Ile Ser Leu Ile
                405                 410                 415
Lys Asp Arg Ile Thr Leu Val Leu Asp Asp Tyr Tyr Phe Ala Thr His
            420                 425                 430
Pro Glu Cys
        435

```
<210> SEQ ID NO 6
<211> LENGTH: 1308
<212> TYPE: DNA
<213> ORGANISM: Artificial Sequence
<220> FEATURE:
<223> OTHER INFORMATION: Kosmotoga olearia fructose-4-epimerase Variant
      polynucleotide_W_ polynucleotide

<400> SEQUENCE: 6
atgaaaaagc atccattgca ggacatcgta tcactgcaga agcagggtat ccccaagggc      60
gtcttctcag tctgttccgc taaccgtttc gtcatcgaga ccactctgga atacgccaag     120
atgaagggca ctacggttct tattgaagca acctgtaacc aggtgaacca gtttggcggc     180
tacaccggta tgactcctgc cgacttccgc gagatggtct tctccattgc tgaagacatt     240
ggccttccta agaacaaaat cattctcggc ggcgaccacc tcggtcccaa tccgtggaag     300
ggtcagcctt ccgaccaggc tatgcggaac gctattgaaa tgattcgcga gtacgccaaa     360
gcaggctttt ggaaactcca cttggacgct tcaatgcggc tggctgacga tcctggaaac     420
gagaacgagc ccttgaaccc agaagtcatt gcagagcgga ctgctctctt gtgcctggaa     480
gccgaacgtg cctttaaaga atccgcaggt tctctccgcc ctgtttacgt cattggcacg     540
gacgttccgc caccaggagg tgctcagaat gagggaaaga gcattcacgt acctccgtg      600 caggacttcg aacgtaccgt tgagcttacc aagaaagcat tctttgacca tggtctctat     660
gaggcctggg gcgtgtgat cgccgttgtt gtgcagcccg cgttgaatt cggtaacgag      720 cacattttg aatatgatcg gaaccgtgca cgcgaattga ccgaagctat caaaaaacac     780
cctaacattg ttttcgaagg ccatagcacg gactaccaga cggccaaagc attgaaggaa     840
```

-continued

```
atggttgaaag acggagtagc aattttgaag gtaggccccg cactgacctt tgcgcttcgg    900
gaagcatttt ttgcgctttc ttccatcgag aaggaacttt tctacgatac ccctggactt    960
tgtagcaact tcgttgaagt tgtagagcgg gctatgctgg acaaccctaa gcactgggaa   1020
aagtactacc agggagagga acgggagaat cggcttgcac gcaaatacag ctttcttgac   1080
cgcctccgtt actattggaa tctgcccgag gtacgtactg ccgtgaataa gttgatcacc   1140
aatttggaaa cgaaagaaat cccattgacg ctcattagcc agttcatgcc gatgcagtat   1200
caaaagattc gcaatggtct gctgcggaaa gatcccatct ctctgatcaa ggaccggatc   1260
accttggtcc tggacgatta ctattttgca acccatcctg aatgttga              1308
```

<210> SEQ ID NO 7
<211> LENGTH: 435
<212> TYPE: PRT
<213> ORGANISM: Artificial Sequence
<220> FEATURE:
<223> OTHER INFORMATION: Kosmotoga olearia fructose-4-epimerase
       Variant_W_amino acid

<400> SEQUENCE: 7

```
Met Lys Lys His Pro Leu Gln Asp Ile Val Ser Leu Gln Lys Gln Gly
1               5                   10                  15

Ile Pro Lys Gly Val Phe Ser Val Cys Ser Ala Asn Arg Phe Val Ile
            20                  25                  30

Glu Thr Thr Leu Glu Tyr Ala Lys Met Lys Gly Thr Thr Val Leu Ile
        35                  40                  45

Glu Ala Thr Cys Asn Gln Val Asn Gln Phe Gly Gly Tyr Thr Gly Met
    50                  55                  60

Thr Pro Ala Asp Phe Arg Glu Met Val Phe Ser Ile Ala Glu Asp Ile
65                  70                  75                  80

Gly Leu Pro Lys Asn Lys Ile Ile Leu Gly Gly Asp His Leu Gly Pro
                85                  90                  95

Asn Pro Trp Lys Gly Gln Pro Ser Asp Gln Ala Met Arg Asn Ala Ile
            100                 105                 110

Glu Met Ile Arg Glu Tyr Ala Lys Ala Gly Phe Trp Lys Leu His Leu
        115                 120                 125

Asp Ala Ser Met Arg Leu Ala Asp Asp Pro Gly Asn Glu Asn Glu Pro
    130                 135                 140

Leu Asn Pro Glu Val Ile Ala Glu Arg Thr Ala Leu Leu Cys Leu Glu
145                 150                 155                 160

Ala Glu Arg Ala Phe Lys Glu Ser Ala Gly Ser Leu Arg Pro Val Tyr
                165                 170                 175

Val Ile Gly Thr Asp Val Pro Pro Gly Gly Ala Gln Asn Glu Gly
            180                 185                 190

Lys Ser Ile His Val Thr Ser Val Gln Asp Phe Glu Arg Thr Val Glu
        195                 200                 205

Leu Thr Lys Lys Ala Phe Phe Asp His Gly Leu Tyr Glu Ala Trp Gly
    210                 215                 220

Arg Val Ile Ala Val Val Gln Pro Gly Val Glu Phe Gly Asn Glu
225                 230                 235                 240

His Ile Phe Glu Tyr Asp Arg Asn Arg Ala Arg Glu Leu Thr Glu Ala
                245                 250                 255

Ile Lys Lys His Pro Asn Ile Val Phe Glu Gly His Ser Thr Asp Tyr
            260                 265                 270
```

```
Gln Thr Ala Lys Ala Leu Lys Glu Met Val Glu Asp Gly Val Ala Ile
            275                 280                 285

Leu Lys Val Gly Pro Ala Leu Thr Phe Ala Leu Arg Glu Ala Phe Phe
        290                 295                 300

Ala Leu Ser Ser Ile Glu Lys Glu Leu Phe Tyr Asp Thr Pro Gly Leu
305                 310                 315                 320

Cys Ser Asn Phe Val Glu Val Glu Arg Ala Met Leu Asp Asn Pro
                325                 330                 335

Lys His Trp Glu Lys Tyr Tyr Gln Gly Glu Arg Glu Asn Arg Leu
            340                 345                 350

Ala Arg Lys Tyr Ser Phe Leu Asp Arg Leu Arg Tyr Tyr Trp Asn Leu
        355                 360                 365

Pro Glu Val Arg Thr Ala Val Asn Lys Leu Ile Thr Asn Leu Glu Thr
    370                 375                 380

Lys Glu Ile Pro Leu Thr Leu Ile Ser Gln Phe Met Pro Met Gln Tyr
385                 390                 395                 400

Gln Lys Ile Arg Asn Gly Leu Leu Arg Lys Asp Pro Ile Ser Leu Ile
                405                 410                 415

Lys Asp Arg Ile Thr Leu Val Leu Asp Asp Tyr Tyr Phe Ala Thr His
            420                 425                 430

Pro Glu Cys
        435

<210> SEQ ID NO 8
<211> LENGTH: 98
<212> TYPE: DNA
<213> ORGANISM: Artificial Sequence
<220> FEATURE:
<223> OTHER INFORMATION: pHCP7

<400> SEQUENCE: 8
gctgcacgaa tacctgaaaa acgttgaacg ccccgtgagc ggtaactcac agggcgtcgg      60
ctaaccccca gtccaaacct gggagaaagc gctcaaaa                             98

<210> SEQ ID NO 9
<211> LENGTH: 481
<212> TYPE: PRT
<213> ORGANISM: Unknown
<220> FEATURE:
<223> OTHER INFORMATION: Thermotoga neapolitana fructose-4-epimerase

<400> SEQUENCE: 9

Met Val Leu Lys Val Phe Lys Asp His Phe Gly Arg Gly Tyr Glu Val
1               5                   10                  15

Lys Gly Glu Glu Gly Lys Ile Leu Val Val Ala Gly Glu Lys Ala Pro
            20                  25                  30

Lys Gly Glu Glu Gly Lys Ile Leu Val Val Ala Gly Glu Lys Ala Pro
        35                  40                  45

Glu Gly Leu Ser Phe Phe Lys Lys Gln Arg Val Glu Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
```

```
            115                 120                 125
Asn Glu Arg Thr Gly Arg Thr Trp Arg Asp Val Leu Asp Asp Ala Thr
130                 135                 140
Trp Gly Val Phe Gln Glu Gly Tyr Ser Glu Gly Phe Gly Ala Asp Ala
145                 150                 155                 160
Asp His Val Lys Arg Pro Glu Asp Leu Val Ser Ala Ala Arg Glu Gly
                165                 170                 175
Phe Thr Met Phe Thr Ile Asp Pro Ser Asp His Val Arg Asn Leu Ser
            180                 185                 190
Lys Leu Ser Glu Arg Glu Lys Asn Glu Met Phe Glu Glu Ile Leu Lys
        195                 200                 205
Lys Glu Arg Ile Asp Arg Ile Tyr Leu Gly Lys Lys Tyr Thr Val Leu
    210                 215                 220
Gly Glu Arg Leu Glu Phe Asp Glu Lys Asn Leu Arg Asp Ala Ala Leu
225                 230                 235                 240
Val Tyr Tyr Asp Ala Ile Ala His Val Asp Met Met Tyr Gln Ile Leu
                245                 250                 255
Lys Asp Glu Thr Pro Asp Phe Asp Phe Glu Val Ser Val Asp Glu Thr
            260                 265                 270
Glu Thr Pro Thr Ser Pro Leu Phe His Ile Phe Val Glu Glu Leu
        275                 280                 285
Arg Arg Arg Gly Val Glu Phe Thr Asn Leu Ala Leu Arg Phe Ile Gly
    290                 295                 300
Glu Trp Glu Lys Gly Ile Asp Tyr Lys Gly Asp Leu Ala Gln Phe Glu
305                 310                 315                 320
Arg Glu Ile Lys Met His Ala Glu Ile Ala Arg Met Phe Glu Gly Tyr
                325                 330                 335
Lys Ile Ser Leu His Ser Gly Ser Asp Lys Phe Ser Val Tyr Pro Ala
            340                 345                 350
Phe Ala Ser Ala Thr Gly Gly Leu Phe His Val Lys Thr Ala Gly Thr
        355                 360                 365
Ser Tyr Leu Glu Ala Val Lys Val Ile Ser Met Val Asn Pro Glu Leu
    370                 375                 380
Phe Arg Glu Ile Tyr Arg Cys Ala Leu Asp His Phe Glu Glu Asp Arg
385                 390                 395                 400
Lys Ser Tyr His Ile Ser Ala Asp Leu Ser Lys Val Pro Glu Val Glu
                405                 410                 415
Lys Val Lys Asp Glu Asp Leu Pro Gly Leu Phe Glu Asp Ile Asn Val
            420                 425                 430
Arg Gln Leu Ile His Val Thr Tyr Gly Ser Val Leu Lys Asp Ala Ser
        435                 440                 445
Leu Lys Glu Arg Leu Phe Lys Thr Leu Glu Gln Asn Glu Glu Leu Phe
    450                 455                 460
Tyr Glu Thr Val Ala Lys His Ile Lys Arg His Val Asp Leu Leu Lys
465                 470                 475                 480
Gly

<210> SEQ ID NO 10
<211> LENGTH: 481
<212> TYPE: PRT
<213> ORGANISM: Artificial Sequence
<220> FEATURE:
<223> OTHER INFORMATION: Thermotoga neapolitana fructose-4-epimerase
      Variant
```

<400> SEQUENCE: 10

```
Met Val Leu Lys Val Phe Lys Asp His Phe Gly Arg Gly Tyr Glu Val
1               5                   10                  15

Lys Gly Glu Glu Gly Lys Ile Leu Val Val Ala Gly Glu Lys Ala Pro
            20                  25                  30

Lys Gly Glu Glu Gly Lys Ile Leu Val Val Ala Gly Glu Lys Ala Pro
        35                  40                  45

Glu Gly Leu Ser Phe Phe Lys Lys Gln Arg Val Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Gln Asp His Val Arg Asn Leu Ser
            180                 185                 190

Lys Leu Ser Glu Arg Glu Lys Asn Glu Met Phe Glu Glu Ile Leu Lys
        195                 200                 205

Lys Glu Arg Ile Asp Arg Ile Tyr Leu Gly Lys Lys Tyr Thr Val Leu
    210                 215                 220

Gly Glu Arg Leu Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Thr Val Asp Glu Asp
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Val Glu Ile Tyr Arg Cys Ala Leu Asp His Phe Glu Glu Asp Arg
385                 390                 395                 400

Lys Ser Thr His Ile Ser Ala Asp Leu Ser Lys Val Pro Glu Val Glu
                405                 410                 415
```

Lys Val Lys Asp Glu Asp Leu Pro Gly Leu Phe Glu Asp Ile Asn Val
                420                 425                 430

Arg Gln Leu Ile His Val Thr Tyr Gly Ser Val Leu Lys Asp Ala Ser
            435                 440                 445

Leu Lys Glu Arg Leu Phe Lys Thr Leu Glu Gln Asn Glu Glu Leu Phe
450                 455                 460

Tyr Glu Thr Val Ala Lys His Ile Lys Arg His Val Asp Leu Leu Lys
465                 470                 475                 480

Gly

<210> SEQ ID NO 11
<211> LENGTH: 1447
<212> TYPE: DNA
<213> ORGANISM: Artificial Sequence
<220> FEATURE:
<223> OTHER INFORMATION: Thermotoga neapolitana fructose-4-epimerase_
      polynucleotide

<400> SEQUENCE: 11

```
atggtcttga aagtgttcaa agatcacttt ggaaggggat acgaagttta cgaaaagtct      60
tatagagaaa aggattctct ctctttcttc ttgacaaagg gagaggaagg aaaaattctg     120
gtagtggctg agaaaaaggc acctgagggt ctgtcgtttt tcaaaaaaca gcgggtggag     180
ggtgtttcgt tcttttttctg tgagagaaat catgagaact tggaagttct cagaaaatac    240
tttccagatc tcaaaccagt tcgagcggga ttgagagcgt cttttggaac aggtgacaga    300
ctcggtatca ccacaccggc tcacgtgagg gcgttgaagg attcagggct ttttcccatc    360
tttgcgcagc aggacgtgag ggagaacgag agaacgggaa ggacctggag agatgtgctg    420
gacgatgcca catggggagt tttccaggag ggatacagtg agggattcgg agcagacgcc    480
gatcacgtga gcggccgga ggatcttgtt tcggctgcaa gggaaggttt caccatgttc    540
acaatcgatc tcaggatca tgtgaggaat ctttcaaaac tcagtgaaag agaaaagaac     600
gagatgttcg aggaaatact gaaaaagag cgaatcgaca ggatctatct tgggaaaaaa    660
tacaccgtcc tcggtgaaag actggagttc gacgagaaaa atttgaggga tgctgctctg    720
gtgtactatg atgcgatcgc ccacgtggat atgatgtatc aaattttgaa agacgaaacc    780
ccggatttcg acttcgaaat gacagttgac gaagatgaaa ctcccacgag tcctctcttc    840
cacattttcg ttgtggaaga actcagacga agaggtgtgg agttcaccaa tcttgccctg    900
agattcatcg gcgaaatgga aagggaata gattacaagg gggatcttgc acagttcgag    960
agagaaatca aaatgcacgc agaaatcgca aggatgttcg aaggatacaa aatatcactc    1020
cactctggaa gcgacaaatt ttccgtgtat cctgcttttg cttccgcgac aggaggcctt    1080
ttccacgtga agacagccgg aacgagttat cttgaggcgg tgaaggtcat atccatggtc    1140
aacccggagc tcttcgttga gatctacagg tgtgctctcg atcactttga ggaagacaga    1200
aagtccacac acatatctgc ggatctgtcg aaagttccgg aagtagagaa agtgaaagat    1260
gaagatcttc caggtctttt tgaagacatc aacgtgagac agttgatcca tgtcacctat    1320
ggctctgttc tgaaagatgc atctttgaaa aacggctgt ttaagacgct tgaacaaaat    1380
gaggaactct tctacgagac cgtggcaaaa catataaaaa ggcacgtaga cctgttgaag    1440
gggctaa                                                               1447
```

<210> SEQ ID NO 12
<211> LENGTH: 1446

```
<212> TYPE: DNA
<213> ORGANISM: Artificial Sequence
<220> FEATURE:
<223> OTHER INFORMATION: Synthetic: variant 2

<400> SEQUENCE: 12
atggtcctga aagtcttcaa ggaccacttt ggacgaggat acgaagttta cgaaaagtct      60
taccgcgaaa aggactctct ttctttcttc ctgaccaagg gagaggaagg caaaatcctc     120
gttgtggccg gtgaaaaagc acctgagggc ctgtcgtttt tcaagaaaca gcgagtggag     180
ggagtctcgt tcttttttctg tgagcgcaat catgagaacc tcgaagtact gcgtaaatac    240
tttccagacc ttaagccagt gcgcgcaggt cttcgtgcct cttttggaac cggcgaccgc     300
cttggcatca ccaccccggc acacgttcgc gcacttaagg actcaggtct ctttcccatc     360
tttgctcagc aggacgtccg cgagaacgag cgcaccggac gcacctggcg agacgttctt     420
gacgatgcta cctggggtgt gttccaggag ggctactccg agggcttcgg tgcagacgct     480
gatcacgtta agcgcccgga ggacctcgta tcggctgcac gtgaaggatt caccatgttc     540
actatcgatc ctcaggacca cgttcgcaat ctctcaaaac tgtccgaacg cgaaaagaac     600
gagatgttcg aggaaattct aaaaaggag cgcatcgatc gtatctactt gggaaaaaaa      660
tataccgtcc ttggagaacg cctggagttc gacgagaaaa atctgcgcga cgctgcactt     720
gtctactatg acgccatcgc acacgttgac atgatgtacc aaatcttgaa agatgaaact     780
ccggacttcg acttcgaaat gaccgtcgat gaagatgaaa ctcccacttc ccctctgttc     840
cacatcttcg tcgtggaaga actgcgccgc cgtggcgttg agttcacgaa tctggcactc     900
cgcttcatcg gcgaaatgga aaaaggcatc gactacaaag gtgacctggc ccagttcgag     960
cgcgaaatca aaatgcacgc tgaaatcgca cgcatgttcg aaggatacaa aatttcactc    1020
cactctggaa gcgacaaatt ttccgtctac cctgcatttg cttccgccac gggaggactc    1080
ttccacgtga aaaccgcagg tacgtcctac ctggaggcag tcaaagtcat ctccatggtg    1140
aacccggagc tgttcgttga gatctatcgc tgcgcactgg accattttga ggaagaccgt    1200
aagtccactc acatctctgc agatctgtcg aaggtgccgg aagtcgagaa ggtcaaagac    1260
gaagaccttc caggtctttt tgaagacatc aacgttcgcc agttgatcca cgtcacctac    1320
ggctctgtcc tgaaagatgc ttcttttgaag gaacgcctct ttaaaaccct cgaacaaaat    1380
gaggaactct tctacgagac cgttgctaaa cacatcaagc gccacgttga tctcttgaaa    1440
ggataa                                                              1446

<210> SEQ ID NO 13
<211> LENGTH: 1446
<212> TYPE: DNA
<213> ORGANISM: Artificial Sequence
<220> FEATURE:
<223> OTHER INFORMATION: Synthetic: variant 1

<400> SEQUENCE: 13
atggtgctga agtgttcaa ggatcacttc ggccgcggct acgaagtgta cgaaaagtcc       60
taccgcgaaa aggactccct gtccttcttc ctgaccaagg gcgaagaagg caagatcctg     120
gtggtggccg gcgaaaaggc cccagaaggc ctgtccttct ttaagaagca gcgcgtggaa     180
ggcgtgtcct tcttcttctg cgaacgcaac cacgaaaacc tggaagtgct gcgcaagtac     240
ttcccagatc tgaagccagt gcgcgccggc ctgcgcgcat ctttcggtac tggcgaccgc     300
ctgggcatca ccaccccagc tcacgtgcgc gccctgaagg actccggcct gttcccaatc     360
```

```
ttcgcccagc aggacgtgcg cgaaaacgaa cgcaccggcc gcacctggcg cgacgttttg    420
gacgacgcaa cctggggcgt gttccaggaa ggctactccg aaggcttcgg cgcagatgca    480
gatcacgtga agcgcccaga agatctggtg tccgcagcac gcgaaggctt caccatgttc    540
accatcgacc cacaggatca cgtgcgcaac ctgtccaagc tgtccgaacg cgaaaagaac    600
gaaatgttcg aagaaatcct gaagaaggaa cgcatcgacc gcatctacct gggcaagaag    660
tacaccgtgc tgggcgaacg cctggaattc gatgaaaaga acctgcgcga tgccgcactg    720
gtgtactacg atgccatcgc ccacgtggac atgatgtacc agatcctgaa ggatgaaacc    780
ccagacttcg acttcgaaat gaccgtggat gaagacgaaa ccccaacctc cccactgttc    840
cacatcttcg tggtggaaga actgcgccgc cgcggcgtgg aattcaccaa cctggcactg    900
cgcttcatcg gcgaaatgga aaagggcatc gactacaagg gcgacctggc acagttcgaa    960
cgcgaaatca agatgcacgc agaaatcgca cgcatgttcg aaggctacaa gatctccctg    1020
cactccggct ccgataagtt ctccgtgtac ccagcattcg catccgcaac cggcggcctg    1080
ttccacgtga agaccgcagg cacctcctac ctggaagccg tgaaggtcat ttccatggtg    1140
aacccagaac tgttcgtgga aatctaccgc tgcgcactgg atcacttcga agaagatcgc    1200
aagtccaccc acatctccgc cgatctgtcc aaggtgccag aagtggaaaa ggtgaaggat    1260
gaagacctgc caggcctgtt cgaagacatc aacgtgcgcc agctgatcca cgtgacctac    1320
ggctccgtgc tgaaggacgc ctccctgaag gaacgcctgt tcaagaccct ggaacagaac    1380
gaagaactgt tctacgaaac cgtggccaag cacatcaagc gccacgtgga cctgctgaag    1440
ggctaa                                                              1446
```